US012138653B2

(12) United States Patent
Shin et al.

(10) Patent No.: US 12,138,653 B2
(45) Date of Patent: Nov. 12, 2024

(54) APPLICATOR AIR MANIFOLD

(71) Applicant: NORDSON CORPORATION, Westlake, OH (US)

(72) Inventors: Sang H. Shin, Duluth, GA (US); Charles P. Ganzer, Cumming, GA (US); Joel E. Saine, Duluth, GA (US)

(73) Assignee: Nordson Corporation, Westlake, OH (US)

( * ) Notice: Subject to any disclaimer, the term of this patent is extended or adjusted under 35 U.S.C. 154(b) by 514 days.

(21) Appl. No.: 17/433,352

(22) PCT Filed: Apr. 3, 2020

(86) PCT No.: PCT/US2020/026562
§ 371 (c)(1),
(2) Date: Aug. 24, 2021

(87) PCT Pub. No.: WO2020/206241
PCT Pub. Date: Oct. 8, 2020

(65) Prior Publication Data

US 2022/0048062 A1 Feb. 17, 2022

Related U.S. Application Data

(60) Provisional application No. 62/829,962, filed on Apr. 5, 2019.

(51) Int. Cl.
*B05C 5/02* (2006.01)

(52) U.S. Cl.
CPC .................................. *B05C 5/0279* (2013.01)

(58) Field of Classification Search
CPC ... B05C 5/0279; B05C 5/0225; B05C 5/0237; B05C 5/02; B05B 7/0861; B05B 7/02
See application file for complete search history.

(56) References Cited

U.S. PATENT DOCUMENTS 3,452,714 A 7/1969 Burke et al.
5,605,720 A 2/1997 Allen et al.
(Continued)

FOREIGN PATENT DOCUMENTS

AT 304959 B 2/1973
CA 2284143 A1 4/2000
(Continued)

OTHER PUBLICATIONS

IPEA/409—International Preliminary Report on Patentability Mailed on Oct. 14, 2021 for WO Application No. PCT/US20/026562.
(Continued)

*Primary Examiner* — Vishal Pancholi
*Assistant Examiner* — Robert K Nichols, II
(74) *Attorney, Agent, or Firm* — BakerHostetler

(57) ABSTRACT

An air manifold for a material dispensing applicator is described. The air manifold has an inlet to receive pressurized air from a pressurized air source, a channel extending therethrough from the inlet, and a plurality of passages in fluid communication with the channel. The air manifold also includes a plurality of pneumatic bolts, where each of the plurality of pneumatic bolts is disposed in a respective one of the plurality of passages and attached to a respective one of the plurality of dispensing modules of the applicator. Each of the plurality of pneumatic bolts directs the pressurized air from the channel of the air manifold to the respective one of the plurality of dispensing modules.

21 Claims, 16 Drawing Sheets

(56) References Cited

U.S. PATENT DOCUMENTS

| | | | | |
|---|---|---|---|---|
| 5,700,322 | A | 12/1997 | Fort | |
| 6,210,141 | B1 | 4/2001 | Allen | |
| 6,375,099 | B1 | 4/2002 | McGuffey | |
| 7,886,989 | B2 * | 2/2011 | Saidman | B05C 5/027 239/296 |
| 10,201,503 | B1 | 2/2019 | Li et al. | |
| 2003/0193111 | A1 | 10/2003 | Lamb et al. | |
| 2004/0053099 | A1 | 3/2004 | Franklin et al. | |
| 2005/0236430 | A1 | 10/2005 | Clark et al. | |
| 2017/0067184 | A1 | 3/2017 | Allen | |

FOREIGN PATENT DOCUMENTS

| | | | |
|---|---|---|---|
| CN | 1204359 | A | 1/1999 |
| CN | 1520937 | A | 8/2004 |
| CN | 103748389 | A | 4/2014 |
| CN | 105818540 | A | 8/2016 |
| DE | 4437906 | A1 | 4/1996 |
| DE | 29918424 | U1 | 1/2000 |
| DE | 69822835 | T2 | 2/2005 |
| DE | 102008014358 | A1 | 10/2009 |
| EP | 0866152 | A1 | 9/1998 |
| EP | 1157746 | A2 | 11/2001 |
| GB | 0430726 | A | 6/1935 |
| GB | 1213242 | A | 11/1970 |
| GB | 1346349 | A | 2/1974 |
| JP | 07-171465 | A | 7/1995 |
| JP | 11-267568 | A | 10/1999 |
| JP | 2006-167532 | A | 6/2006 |

OTHER PUBLICATIONS

ISA/220—Notification of Transmittal or Search Report and Written Opinion of the ISA/237, or the Declaration Mailed on Jul. 29, 2020 for WO Application No. PCT/US20/026562.

* cited by examiner

APPLICATOR AIR MANIFOLD

CROSS-REFERENCE TO RELATED APPLICATIONS

This application is a National Stage Application of International Patent App. No. PCT/US2020/026562, filed Apr. 3, 2020, which claims the benefit of U.S. Provisional Patent App. No. 62/829,962, filed Apr. 5, 2019, the entire disclosures of both of which are hereby incorporated by reference as if set forth in their entirety herein.

TECHNICAL FIELD

This disclosure generally relates to a material applicator air manifold, and more particularly to an air manifold providing pressurized air and releasably connected to a plurality of dispensing modules of a material applicator.

BACKGROUND

Known applicators for applying fluid material, such as adhesives, solder pastes, conformal coatings, encapsulants, underfill materials, and surface mount adhesives generally operate to apply material to a substrate through one or more nozzle assemblies. The flow of material to the nozzle assemblies can be controlled by one or more dispensing modules that can selectively provide the material to the one or more of the nozzle assemblies. Though various means are known for controlling such dispensing modules, a typical method of controlling such dispensing applicators is pneumatically through pressurized air.

Common air manifolds can typically provide pressurized air received from a pressurized air source to one or more dispensing modules of the applicator. During operation of the applicator, it can become necessary to remove one of the dispensing modules from the applicator for servicing or replacement. However, this can prove to be difficult, as known air manifolds can require detaching each of the dispensing modules from the applicator in order to replace one dispensing module. Alternatively, known air manifolds can require detaching the entire air manifold from each of the dispensing modules in order to replace one dispensing module. This process can also typically require amounts of force and tools that risk damaging expensive components of the applicator, which can cause added expense and difficulty to the applicator operator. Further, this process can be time-intensive, thus creating prolonged stoppages in the dispensing of material.

As a result, there is a need for an air manifold that allows for a dispensing module to be easily detached from the applicator and replaced while allowing the remaining dispensing modules to remain attached to both the applicator and the air manifold.

SUMMARY

In one example, an applicator for dispensing a material includes a manifold, a plurality of dispensing modules releasably attached to the manifold, where each of the plurality of dispensing modules is configured to dispense the material, and an air manifold. The air manifold is removably connected to each of the plurality of dispensing modules such that at least one of the dispensing modules can be removed from the applicator while at least one other of the dispensing modules remains attached to both the manifold and the air manifold. The air manifold defines an inlet configured to receive pressurized air from a pressurized air source, a plurality of passages that extend through the air manifold, and a channel extending from the inlet to the plurality of passages such that the plurality of passages are in fluid communication with the channel. Each of the plurality of passages is in fluid communication with a respective one of the plurality of dispensing modules to direct the pressurized air from the channel to the respective one of the plurality of dispensing modules.

Another example includes a method of servicing a fluid material applicator that comprises a manifold, a plurality of dispensing modules attached to the manifold, and an air manifold that is attached to the plurality of dispensing modules The method comprises a step of detaching a select dispensing module of the plurality of dispensing modules from the air manifold by detaching a select pneumatic bolt that extends through the air manifold to the dispensing module. The select pneumatic bolt is configured to provide pressurized air from the air manifold to the select dispensing module when the select pneumatic bolt attaches the select dispensing module to the air manifold. The method comprises a step of detaching the select dispensing module from the manifold while at least one other of the dispensing modules remains attached to both the manifold and the air manifold.

BRIEF DESCRIPTION OF THE DRAWINGS

The foregoing summary, as well as the following detailed description, will be better understood when read in conjunction with the appended drawings. The drawings show illustrative examples of the disclosure. It should be understood, however, that the application is not limited to the precise arrangements and instrumentalities shown.

DETAILED DESCRIPTION

Figure 1:
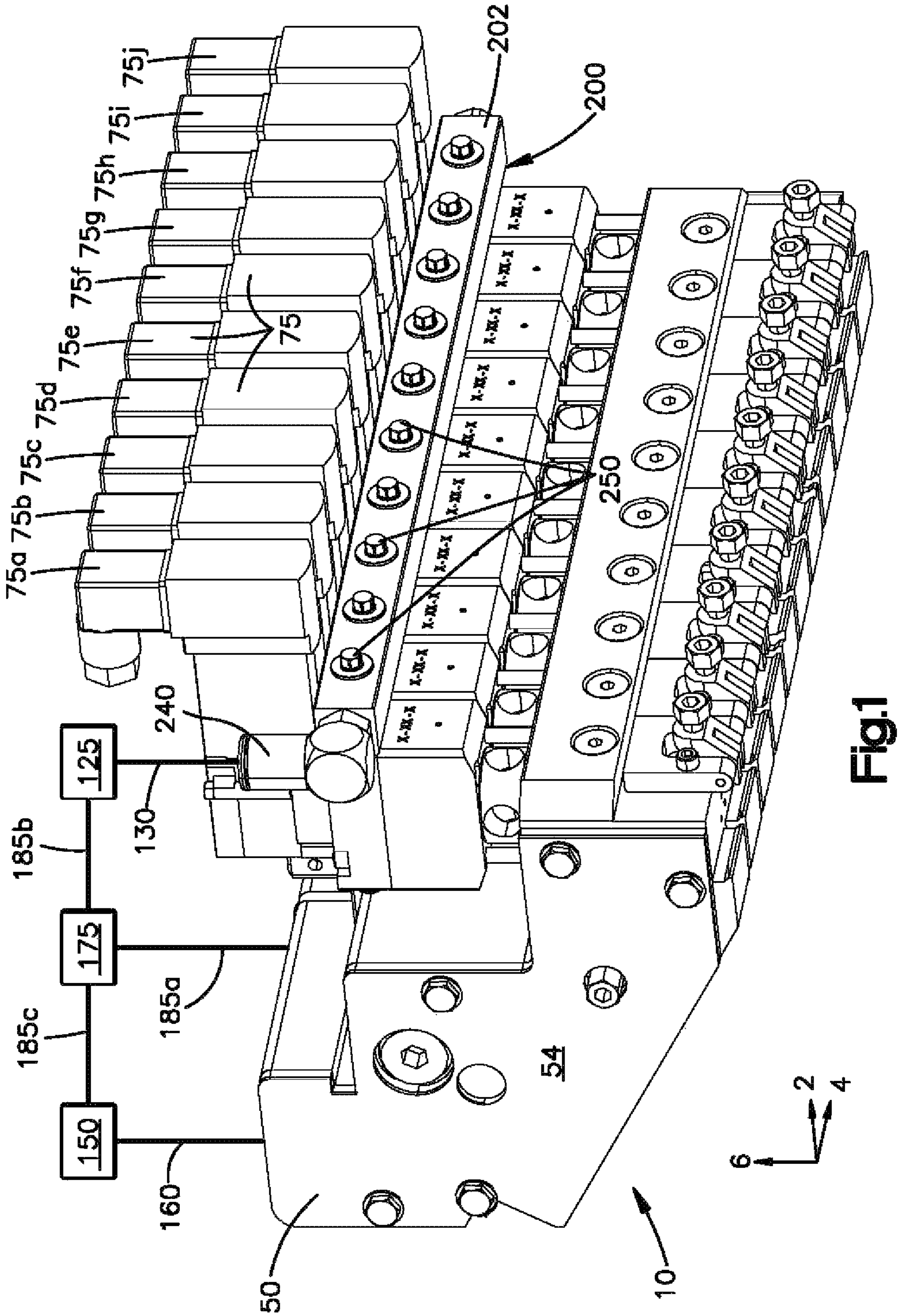
FIG. 1 illustrates a perspective view of an applicator according to an example of the present disclosure, with a material source, controller, and pressurized air source shown schematically.

Described herein are applicators 10 (shown in FIG. 1) and 10' (shown in FIG. 10) that include a manifold 50, a plurality of dispensing modules 75 (FIG. 1), 76 and 77 (FIG. 10), and an air manifold assembly 200. The plurality of dispensing modules 75 are configured to be coupled to the manifold 50 and the air manifold assembly 200. The air manifold assembly 200 is configured to provide pressurized air to the plurality of dispensing modules 75, 76, 77. The manifold 50 is configured to provide a material to the dispensing modules 75, 76, and 77. The dispensing modules 75, 76, and 77 are configured to dispense the material onto, for example, a substrate. Certain terminology is used to describe the applicators 10, 10' in the following description for convenience only and is not limiting. The words "right," "left," "lower," and "upper" designate directions in the drawings to which reference is made. The words "inner" and "outer" refer to directions toward and away from, respectively, the geometric center of the description to describe the applicators 10, 10' and related parts thereof. The words "forward" and "rearward" refer to directions in a longitudinal direction 2 and a direction opposite the longitudinal direction 2 along the applicators 10, 10' and related parts thereof. The terminology includes the above-listed words, derivatives thereof, and words of similar import.

Unless otherwise specified herein, the terms "longitudinal," "vertical," and "lateral" are used to describe the orthogonal directional components of various components of the applicators 10, 10', as designated by the longitudinal direction 2, lateral direction 4, and vertical direction 6. It should be appreciated that while the longitudinal and lateral directions 2, 4 are illustrated as extending along a horizontal plane, and the vertical direction 6 is illustrated as extending along a vertical plane, the planes that encompass the various directions may differ during use.

Examples of the present disclosure include an applicator 10 for dispensing adhesive onto a substrate during product manufacturing. Referring to FIG. 1, the applicator 10 can include a manifold 50 that comprises a body 54. The body 54 of the manifold 50 can be comprised of a metal, and can be configured as a monolithic piece or an assembly of a plurality of manifold segments. Though one specific example of the manifold 50 is shown, the manifold can comprise other shapes and/or configurations as desired. The manifold 50 can be configured to receive a material through an inlet, and subsequently direct the material through the body 54 of the manifold 50 via a network of internal channels (not shown). The manifold 50 can receive the material from a material source 150, which can selectively provide the material to the manifold 50 through a conduit 160 such as a hose or pipe. The material can be a fluid material, such as any of a variety of adhesives, solder pastes, conformal coatings, encapsulants, underfill materials, and surface mount adhesives. However, this list is only representative, and it is contemplated that the material can comprise any substance that is dispensed onto a product during a manufacturing operation.

The material source 150 can comprise any device capable of storing the material and selectively providing the material to the manifold 50. For example, the material source 150 can be a melter configured to receive a supply of solid adhesive, selectively melt the solid adhesive into a liquid adhesive, and pump the liquid adhesive to the manifold 50. However, other material sources 150 are contemplated. The material source 150 can be connected to the manifold 50 via a conduit 160, such as a hose or pipe, where the conduit 160 can be configured to receive the material from the material source 150 and provide the material to the manifold 50. The conduit 160 can be a heated hose or any type of conventional hose capable of directing a supply of liquid material from the material source 150 to a manifold 50.

Figure 18A:
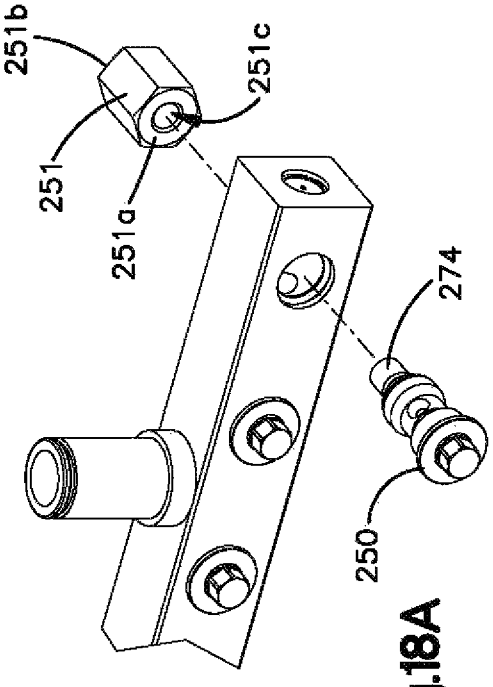
FIG. 18A illustrates an exploded perspective view of a portion of an air manifold assembly of the applicator of FIG. 18.
Figure 18:
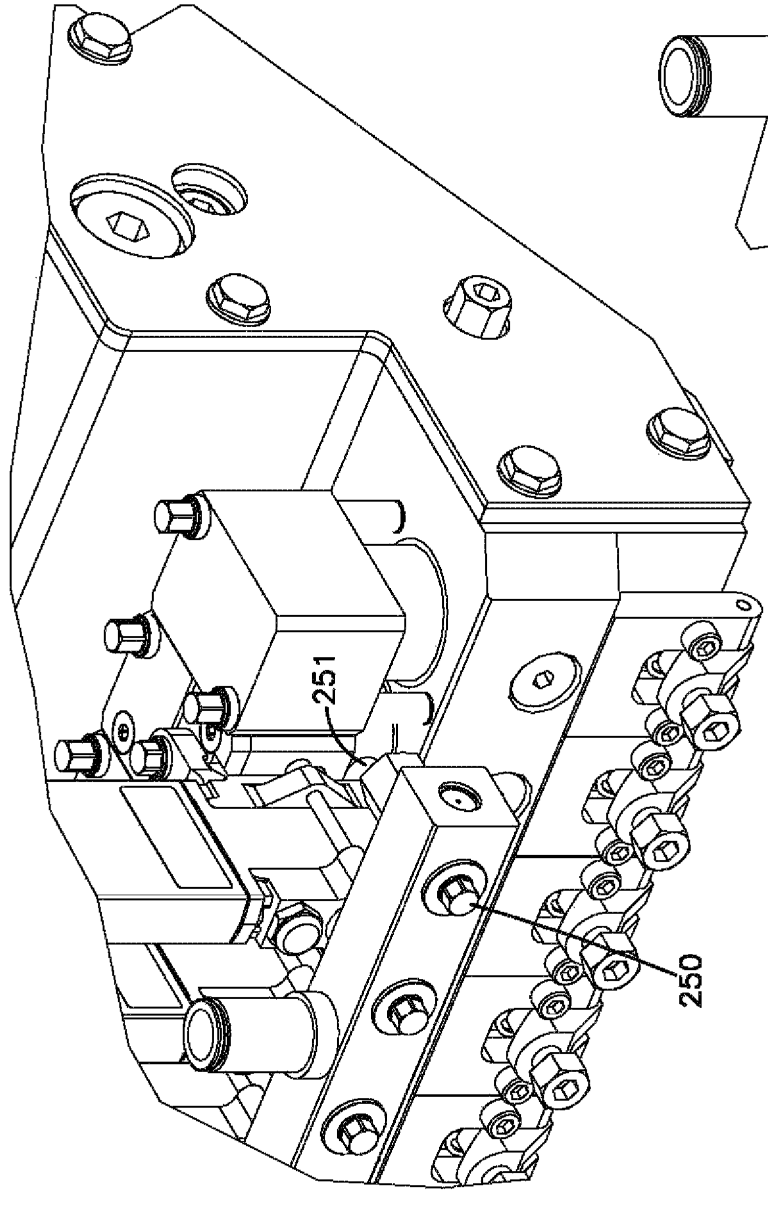
FIG. 18 illustrates a perspective view of a portion of an applicator according to one example in which a dispensing module is replaced with a blank.

The applicator 10 can also include a plurality of dispensing modules 75 attached to the manifold 50. In the depicted example, the plurality of dispensing modules 75 includes ten dispensing modules: a first dispensing module 75*a*, a second dispensing module 75*b*, a third dispensing module 75*c*, a fourth dispensing module 75*d*, a fifth dispensing module 75*e*, a sixth dispensing module 75*f*, a seventh dispensing module 75*g*, an eighth dispensing module 75*h*, a ninth dispensing module 75*i*, and a tenth dispensing module 75*j*. Though the plurality of dispensing modules 75 is depicted as including ten dispensing modules 75*a*-75*j*, the plurality of dispensing modules 75 can include more or less than ten dispensing modules. For example, the plurality of dispensing modules 75 can include two, three, four, five, six, seven, eight, nine, or more than ten dispensing modules 75. Additionally, though the plurality of dispensing modules 75 may include a certain number of dispensing modules 75, the applicator 10 may be configured to continue operation with a number of the dispensing modules 75 removed from the applicator 10. In such instances, blanks can be used to replace the removed dispensing modules 75 as will be described in further detail below in relation to FIGS. 18 and 18A.

Each of the dispensing modules 75 can be releasably attached to the manifold 50. In one example, each of the dispensing modules 75 are attached to the body 54 of the manifold 50 through a plurality of fasteners (not shown). Alternatively, each of the dispensing modules 75 can be attached to the manifold 50 through threaded engagement, slot and groove attachment, etc. Each of the dispensing modules 75 is configured to be detached from the manifold 50 without detaching any other of the plurality of dispensing modules 75 from the manifold 50, as will be described further below. The body 54 of the manifold 50 is configured to receive the material from the material source 150 through the conduit 160 and direct the material to each of the dispensing modules 75. The plurality of dispensing modules 75 are configured to receive the material and—selectively and independently from each of the other ones of the plurality of dispensing modules 75—dispense the material through one or more nozzles (not shown) that are attached to the manifold 50 and onto a substrate.

Each of the plurality of dispensing modules 75 can be pneumatically driven, and likewise must receive pressurized air in order to selectively dispense the material. As a result, each of the dispensing modules 75 can receive pressurized air from an air manifold assembly 200, which will be described further below in detail. The air manifold assembly 200 can receive the pressurized air from a pressurized air source 125 which can be configured to provide the pressurized air to the air manifold assembly 200 through a conduit 130 such as a hose or pipe. The pressurized air source 125 can be configured to provide regulated, compressed, and/or oil and moisture free air to the air manifold assembly 200. However, any conventional source of pressurized air can be utilized.

The applicator 10 can include a controller 175 that is configured to control operation of one or more, up to all, of the plurality of dispensing modules 75, the pressurized air source 125, and the material source 150. The controller 175 can comprise any suitable computing device configured to host a software application for monitoring and controlling various operations of the applicator 10 as described herein. It will be understood that the controller 175 can include any appropriate computing device, examples of which include a processor, a desktop computing device, a server computing device, or a portable computing device, such as a laptop, tablet, or smart phone. Specifically, the controller 175 can include a memory and a human-machine interface (HMI) device. The memory can be volatile (such as some types of RAM), non-volatile (such as ROM, flash memory, etc.), or a combination thereof. The controller 175 can include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 175. The HMI device can include inputs that provide the ability to control the controller 175, via, for example, buttons, soft keys, a mouse, voice actuated controls, a touch screen, movement of the controller 175, visual cues (e.g., moving a hand in front of a camera on the controller 175), or the like. The HMI device can provide outputs, via a graphical user interface, including visual information via a display. Other outputs can include audio information (e.g., via speaker), mechanically (e.g., via a vibrating mechanism), or a combination thereof. In various configurations, the HMI device can include a display, a touch screen, a keyboard, a mouse, a motion detector, a speaker, a microphone, a camera, or any combination thereof. The HMI device can further include any suitable device for inputting biometric information, such as, for example, fingerprint information, retinal information, voice information, and/or facial characteristic information, for instance, so as to require specific biometric information for accessing the controller 175.

The controller 175 can be connected to the manifold 50, and likewise the plurality of dispensing modules 75, through a signal connection 185*a*. The controller 175 can also be connected to the pressurized air source 125 and the material source 150 through the signal connections 185*b*, 185*c*, respectively. Each of the signal connections 185*a*-185*c* can comprise wireless and/or wired connections, and can each allow the controller 175 to provide instructions to and receive information from the manifold 50, pressurized air source 125, and material source 150. Through the signal connection 185*a*, the controller 175 can receive feedback from various sensors within the manifold 50 and control various aspects of the manifold 50 and plurality of dispensing modules 75. Through the signal connection 185*b*, the controller 175 can control the pressurized air source 125 so as to control the air flow frequency, air flow duration, and pressure of pressurized air provided to the air manifold assembly 200 and likewise the plurality of dispensing modules 75. Through the signal connection 185*c*, the controller 175 can control the material source 150 so as to control the flow frequency, flow duration, and flow magnitude of material pumped from the material source 150 to the manifold 50.

Figure 3A:
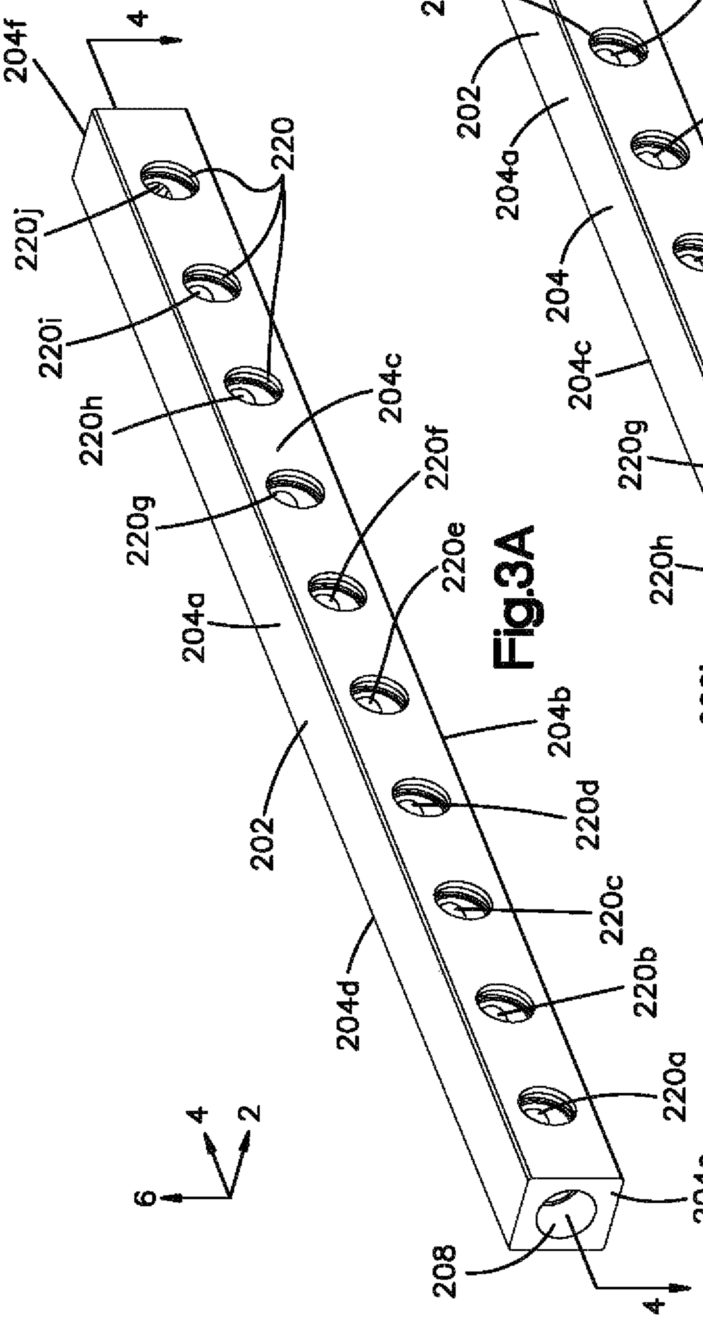
FIG. 3A illustrates a perspective view of an air manifold of the air manifold assembly shown in FIG. 2.
Figure 3B:
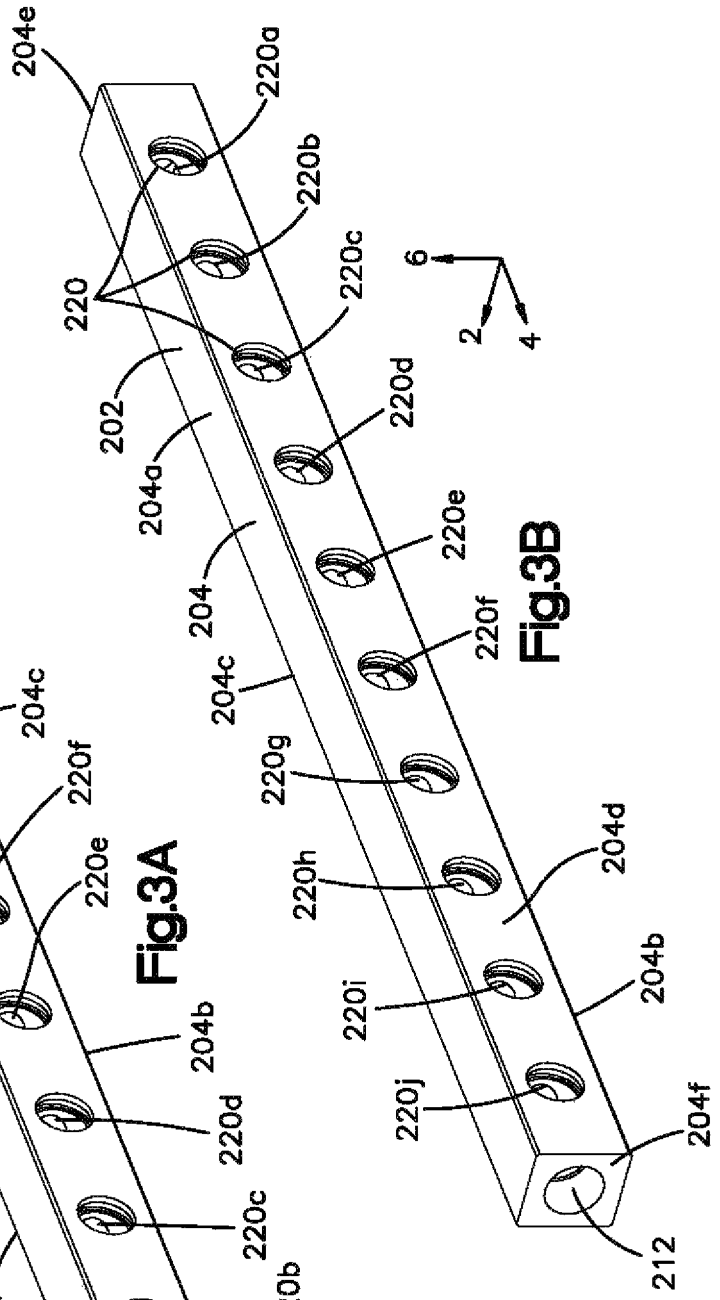
FIG. 3B illustrates an alternative perspective view of the air manifold shown in FIG. 3A.
Figure 4:
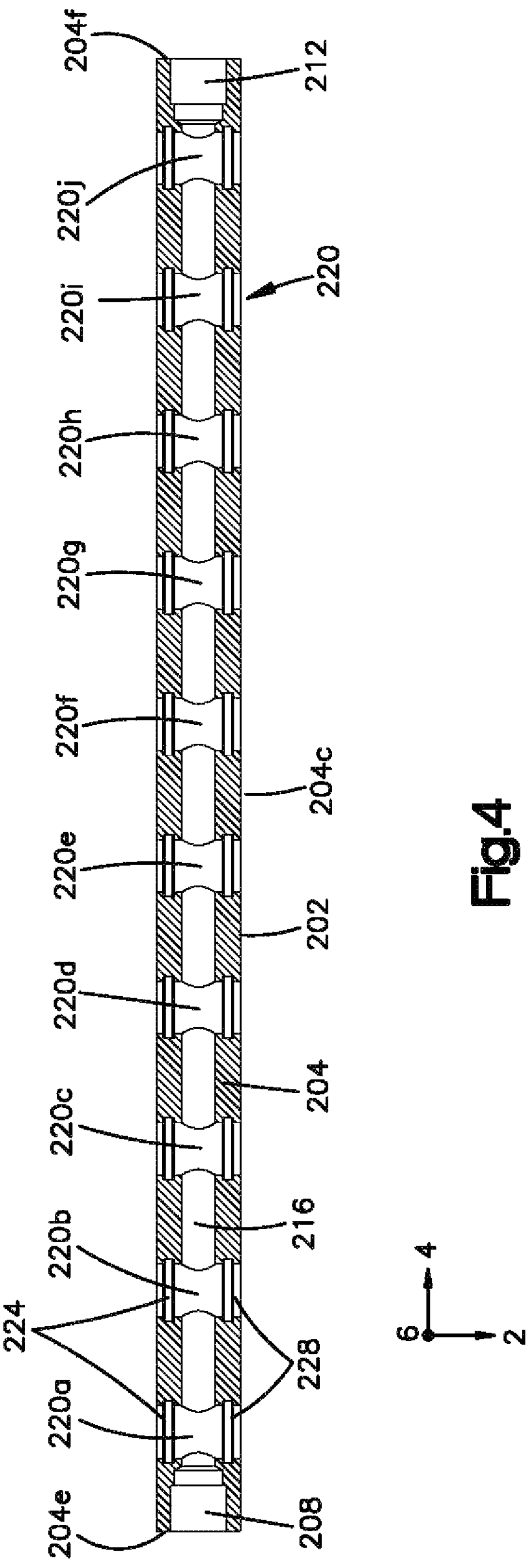
FIG. 4 illustrates a cross-sectional view of the air manifold shown in FIG. 3A, taken along line 4-4 shown in FIG. 3A.
Figure 5B:
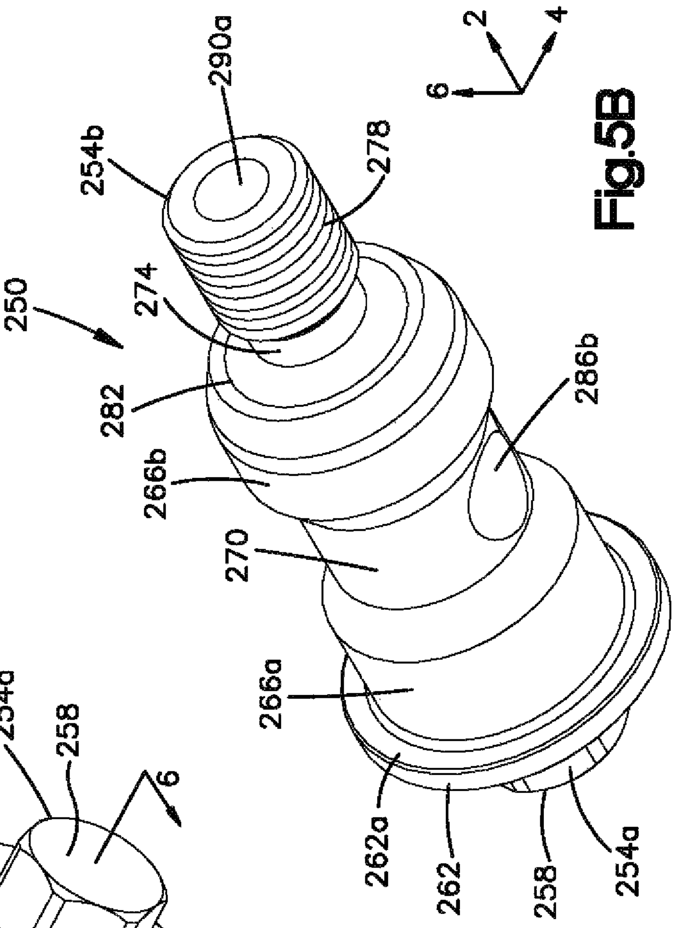
FIG. 5B illustrates an alternative perspective view of the pneumatic bolt shown in FIG. 5A.
Figure 5A:
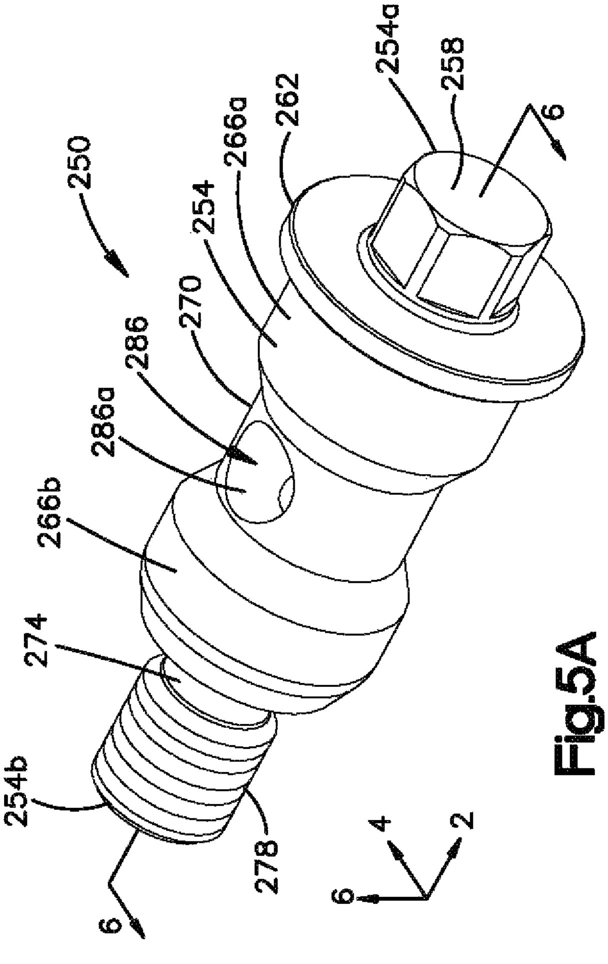
FIG. 5A illustrates a perspective view of a pneumatic bolt of the air manifold assembly shown in FIG. 2.
Figure 6:
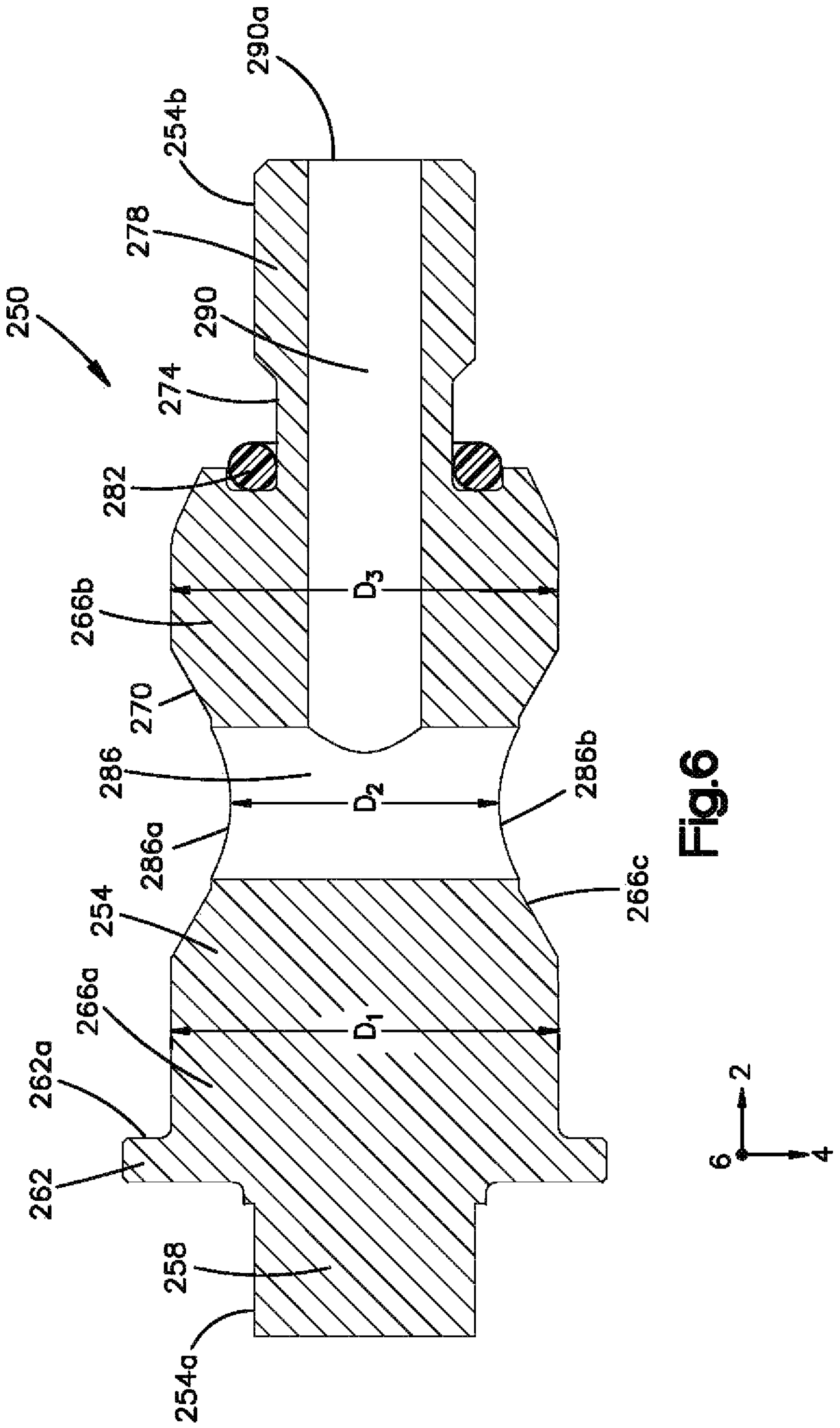
FIG. 6 illustrates a cross-sectional view of the pneumatic bolt shown in FIG. 5A, taken along line 6-6 shown in FIG. 5A.

Continuing with FIGS. 2-4, the air manifold assembly 200, which is configured to receive pressurized air from the pressurized air source 125 and direct the pressurized air to each of the plurality of dispensing modules 75, will be discussed in greater detail. The air manifold assembly 200 can comprise an air manifold 202. The air manifold 202 can comprise a manifold body 204 that has at least one outer surface. For example, the at least one outer surface can comprise an upper surface 204*a* and a lower surface 204*b* opposite the upper surface 204*a* along the vertical direction 6. The at least one outer surface can comprise can include a front surface 204*c* and a rear surface 204*d*. The front surface can extend between the upper surface 204*a* and the lower surface 204*b*. The rear surface 204*d* can be opposite the front surface 204*c* along the longitudinal direction 2. The rear surface 204*b* can extend between the upper surface 204*a* and the lower surface 204*b*. The at least one outer surface can comprise can include a first side surface 204*e* and a second side surface 204*f*. The first side surface can extend between the upper surface 204*a* and the lower surface 204*b* and between the front surface 204*c* the rear surface 204*d*. The second side surface 204*f* can be opposite the first side surface 204*e* along the lateral direction 4. The second side surface 204*f* can extend between the upper surface 204*a* and the lower surface 204*b* and between the front surface 204*c* and the rear surface 204*d*. As depicted, the surfaces 204*a*-204*f* can each be substantially planar and meet each other at substantially right angles. However, in other examples the surfaces 204*a*-204*f* can be alternatively configured. Moreover, although the air manifold 202 is depicted as comprising a rectangular prism, other shapes are contemplated.

The body 204 of the air manifold 202 can be formed as a monolithic piece. For example, the body 204 can comprise a single piece of machined metal such as steel, though other materials and manufacturing methods are contemplated. In other examples, it is contemplated that the body 204 can comprise multiple discrete pieces that are interconnected to form the air manifold 202. The body 204 can define a plurality of channels and openings configured to direct a flow of pressurized air through the air manifold 202. The body 204 can define a first opening 208 that that extends into the at least one outer surface of the body 204. The first opening 208 can define an inlet of the air manifold 202 that is configured to receive pressurized gas such as air. In the depicted example, the first opening 208 is defined in the first side surface 204*e* of the body 204, though the first opening 208 can be defined in any of the surfaces 204*a*-204*f* of the body 204 as desired. The air manifold assembly 200 can include an inlet adapter 240 configured to be coupled to, such as at least partially received within, the first opening 208. The inlet adapter 240 can be a conduit. For example, in FIGS. 1 and 2, the inlet adapter 240 comprises an elbow adapter, though other examples of the inlet adapter 240 are contemplated. The inlet adapter 240 can be configured to engage the conduit 130 at one end, so as to receive pressurized air from the pressurized air source 125. At the opposite end, the inlet adapter 240 can be configured to couple to, such as be at least partially received within, the first opening 208 such that the first opening 208 can receive the pressurized air from the pressurized air source 125. The inlet adapter 240 can engage the conduit 130 and/or the air manifold 202 through a threaded connection, clamping engagement, press-fit, snap-fit, etc., though other methods of engaging the inlet adapter 240 with the conduit 130 and the air manifold 202 are contemplated.

The body 204 of the air manifold 202 can optionally define a second opening 212. In the depicted example, the second opening 212 extends into the at least one outer surface of the body 204. The second opening 212 can be defined in the second side surface 204*f* of the body 204, though the second opening 212 can be defined in any of the surfaces 204*a*-204*f* of the body 204 as desired. The air manifold assembly 200 can include a plug 244 configured to be coupled to, such as at least partially received within, the second opening 212. The plug 244 can have a body sized and shaped to provide a fluid seal at the second opening 212 such that pressurized air flowing within the body 204 of the air manifold 202 does not escape through the second opening 212. The plug 244 can engage the body 204 through a threaded connection, clamping engagement, press-fit, snap-fit, etc., though other methods of engaging the plug 244 with the body 204 and are contemplated. In other embodiments, another inlet adapter (not shown) can be connected to the air manifold 202 at the second opening 212, or a device allowing pressurized air to escape from the air manifold 202. The other inlet adapter can be configured as described above in relation to inlet adapter 240. Also, the air manifold 202 can be configured such that the plug 244 is coupled to the first opening 208 and the inlet adapter 240 is coupled to the second opening 212.

The body 204 of the air manifold 202 can define a channel 216 that extends from the first opening 208 to the second opening 212. In one example, the channel 216 can have a circular cross-section that maintains a constant diameter as it extends linearly along the lateral direction 4 from the first opening 208 to the second opening 212. However, it is contemplated that the channel 216 can define other cross-sectional shapes, diameters, or can extend along a variety of directions. The body 204 of the air manifold 202 can also define a plurality of passages 220 that are in fluid communication with the channel 216. In the depicted example, the body 204 can include ten passages: a first passage 220*a*, a second passage 220*b*, a third passage 220*c*, a fourth passage 220*d*, a fifth passage 220*e*, a sixth passage 220*f*, a seventh passage 220*g*, an eighth passage 200*h*, a ninth passage 220*i*, and a tenth passage 220*j*. Though the plurality of passages 220 is depicted as including ten passages 220*a*-220*j*, the plurality of passages 220 can include more or less than ten passages. For example, the plurality of passages 220 can include two, three, four, five, six, seven, eight, nine, or more than ten passages.

Each of the passages 220 can extend through the body 204 of the air manifold 202. For example, each passage 220 can extend from one surface to an opposite surface. In the depicted example, each of the plurality of passages 220 extends from the front surface 204*c* to the rear surface 204*d*. However, in other examples any of the plurality of passages 220 can alternatively extend from the upper surface 204*a* to the lower surface 204*b*, or from the first side surface 204*e* to the second side surface 204*f*. Also, each of the passages 220 is shown as extending substantially parallel to the longitudinal direction 2, though it is contemplated that each of the passages 220 can extend along any combination of the longitudinal, lateral, and vertical directions 2, 4, 6. Each of the passages 220 can have a substantially circular cross-sectional shape that is configured to receive a pneumatic bolt 250 (discussed further below) therethrough and into a dispensing module 75.

In the depicted example, the plurality of passages 220 are shown as being equidistantly spaced apart along the lateral direction 4. However, the spacing between one or more of the passages 220 can vary. Thus, in other examples, any number of the passages 220 can be spaced greater distances from each of the other passages 220. The spacing of the plurality of passages 220 can also be adjusted when the number of passages 220 varies from that shown. Generally, each of the passages 220 will be aligned with an air inlet defined by a respective one of the plurality of dispensing modules 75. As such, the spacing of the passages 220 can be determined based upon the dimensions and spacing of the plurality of dispensing modules 75 to which the air manifold assembly 200 is to be attached.

The manifold body 204 can define at least one groove for each passage 220 that is configured to receive a seal. Each groove can be open to a respective one of the passages 220. For example, the manifold body 204 can define a first seal groove 224 for each passage 220 that is configured to receive a first seal 232. The first seal groove 224 of each of the passages 220 can have a substantially ring-like shape. The first seal groove 224 of each passage 220 have a cross-sectional dimension that is greater than a cross-sectional dimension of its corresponding passage 220. The first seal groove 224 can be defined between the rear surface 204*d* and the channel 216 along the longitudinal direction 2. For example, the first seal groove 224 can be substantially equidistant from the rear surface 204*d* and the channel 216. However, other spacing of the first seal groove 224 from the rear surface 204*d* and the channel 216 is contemplated. The first seal 232 can comprise a conventional O-ring, or any other variety of flexible devices capable of creating a fluid seal between two components.

The manifold body 204 can define a second seal groove 228 for each passage 220. Each second seal groove 228 can be configured to receive a second seal 236. The second seal groove 228 of each of the passages 220 can have a substantially ring-like shape. The second seal groove 228 of each passage 220 have a cross-sectional dimension that is greater than a cross-sectional dimension of its corresponding passage 22*o*. The second seal groove 228 can be defined between the front surface 204*c* and the channel 216 along the longitudinal direction 2. For example, the second seal groove 228 can be substantially equidistant from the front surface 204*c* and the channel 216. However, other spacing of the second seal groove 228 from the front surface 204*c* and the channel 216 is contemplated. As a result, the channel 216 can be positioned between the first and second seals 232, 236. The second seal 236 can comprise a conventional O-ring, or any other variety of flexible devices capable of creating a fluid seal between two components. Though the first and second seal grooves 224, 228 are depicted as being substantially identical, they can differ in other examples. Similarly, though the first and second seals 232, 236 are depicted as substantially identical, they can differ in other examples.

Figure 2:
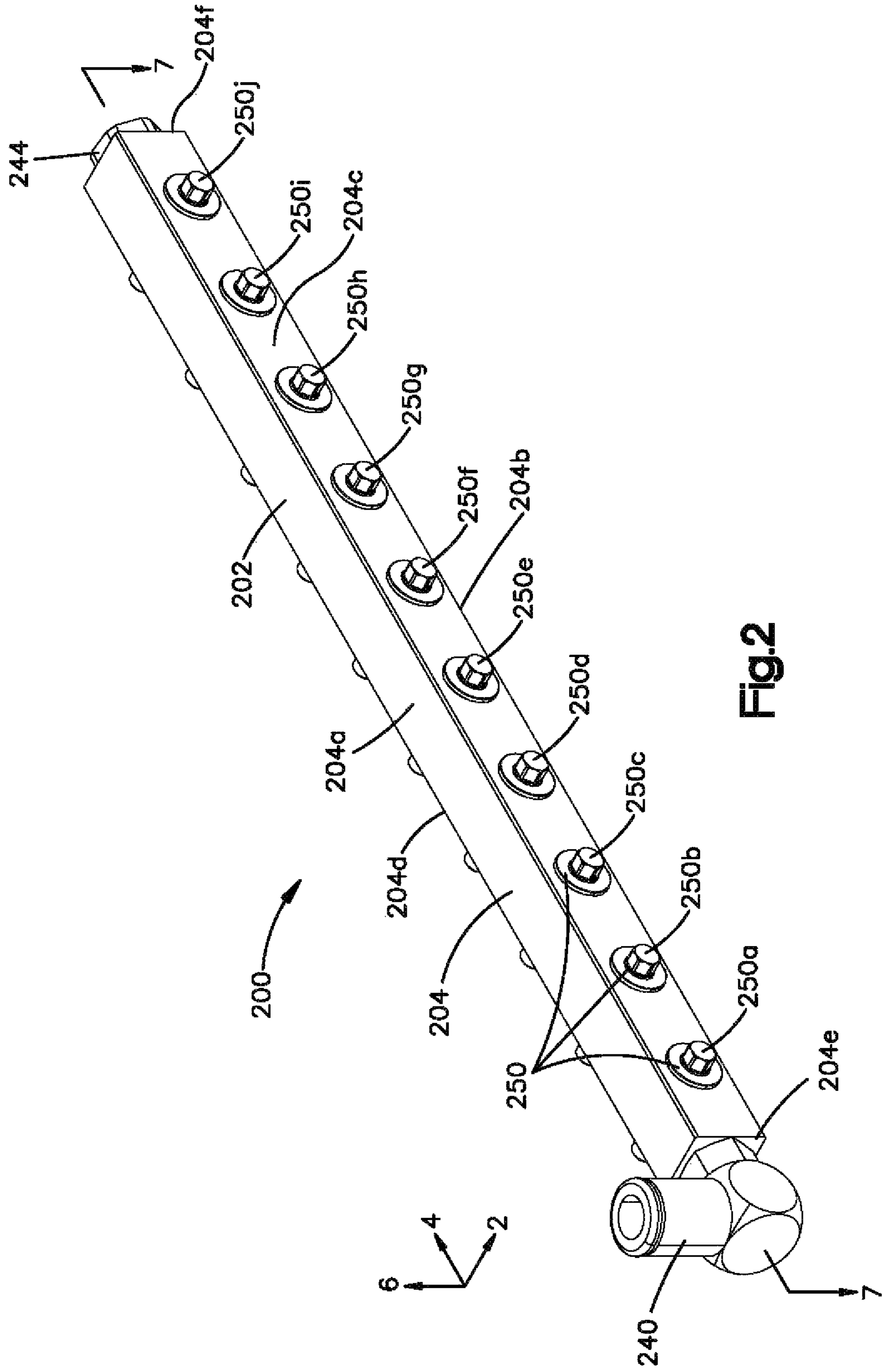
FIG. 2 illustrates a perspective view of an air manifold assembly of the applicator shown in FIG. 1.

Referring to FIG. 2, the air manifold assembly 200 can include a plurality of pneumatic bolts 250. Each of the plurality of pneumatic bolts 250 is configured to be disposed in a respective one of the plurality of passages 220 and attach to a respective one of the plurality of dispensing modules 75, as will be described further below. In the depicted example, the air manifold assembly 200 can include ten pneumatic bolts: a first pneumatic bolt 250*a*, a second pneumatic bolt 250*b*, a third pneumatic bolt 250*c*, a fourth pneumatic bolt 250*d*, a fifth pneumatic bolt 250*e*, a sixth pneumatic bolt 250*f*, a seventh pneumatic bolt 250*g*, an eighth pneumatic bolt 250*h*, a ninth pneumatic bolt 250*i*, and a tenth pneumatic bolt 250*j*. Though the plurality of pneumatic bolts 250 is depicted as including ten pneumatic bolts 250*a*-250*j*, the plurality of pneumatic bolts 250 can include more or less than ten pneumatic bolts 250. For example, the plurality of pneumatic bolts 250 can include two, three, four, five, six, seven, eight, nine, or more than ten pneumatic bolts 250. Generally, the number of pneumatic bolts 250 comprising the plurality of pneumatic bolts 250 included in the air manifold assembly 200 will be dictated by the number of the plurality of dispensing modules 75 attached to the manifold 50 and/or the number of the plurality of passages 220 that extend through the air manifold 202. Additionally, though the plurality of pneumatic bolts 250 may include a certain number of pneumatic bolts, the applicator 10 may be configured to continue operation with any of the pneumatic bolts 250*a*-250*j* detached from the air manifold 202. Turning now to FIGS. 5A-7, an example of a pneumatic bolt 250 is shown that can be used to implement each of one or more of the pneumatic bolts 250*a*-250*j* above. The pneumatic bolt 250 can have a body 254 that extends from a first end 254*a* to a second end 254*b* opposite the first end 254*a* along the longitudinal direction 2, where the second end 254*b* can be configured to releasably attach to one of the dispensing modules 75. The body 254 can be configured to be received in a corresponding one of the passages 220. Thus, the body 254 can have a cross-sectional dimension that is less than that of the corresponding passage 220. In one example, the second end 254*b* of the pneumatic bolt 250 can be configured to threadedly engage a respective one of the plurality of dispensing modules 75. Specifically, the second end 254*b* can define an extension 274 that extends along the longitudinal direction 2 and includes a threading 278 configured to releasably engage the inner surface of a bore defined by one of the plurality of dispensing modules 75. As a result, the pneumatic bolt 250 can be configured to be releasably attached to a respective one of the plurality of dispensing modules 75. Though threading 278 is shown, the pneumatic bolt 250 may include an alternative fastener for releasably attaching to a respective one of the dispensing modules 75. For example, the pneumatic bolt 250 can be snap-fit or releasably attached through a variety of means to a respective one of the plurality of dispensing modules 75. A seal 282 can be disposed around the extension 274 so as to create a fluid seal between the pneumatic bolt 250 and the respective dispensing module 75 when the pneumatic bolt 250 is attached to the dispensing module 75.

The first end 254*a* of the pneumatic bolt 250 can define an engagement feature or drive surface 258 that is configured to interface with a tool (not shown), where the tool is configured to detach the pneumatic bolt 250 from one of the dispensing modules 75. The drive surface 258 can have a non-circular cross-section that is configured to be engaged by drive surface of the tool. In the depicted example, the engagement feature 258 can define a hex head. However, in other examples the engagement feature 258 can comprise a flathead, Philips head, star head, etc. By engaging the tool with the engagement feature 258 and rotating the pneumatic bolt 250, an operator of the applicator 10 can selectively engage and disengage the pneumatic bolt 250 from the respective dispensing module 75. It is also contemplated that the pneumatic bolt 250 can include an engagement feature 258 that allows the user to disengage the pneumatic bolt 250 from the respective dispensing module 75 without the aid of any tool, as will be described further below.

The pneumatic bolt 250 can also define a stop surface 262*a* adjacent to the engagement feature 258 that extends radially outwards from the body 254 of the pneumatic bolt 250. In one example, the stop surface 262*a* can be defined by a flange 262. The flange 262 can be substantially shaped as a disc, though other shapes are contemplated. The stop surface 262*a* can have a cross-sectional dimension that is greater than a cross-sectional dimension of a corresponding one of the passages 220. Thus, the stop surface 262*a* can limit the extent to which the pneumatic bolt 250 can be inserted into the air manifold 202 when the pneumatic bolt 250 is inserted into a corresponding one of the passages 220 of the air manifold 202. The body 254 of the pneumatic bolt 250 can define a first region 266*a* extending from the stop surface 262*a*, where the first region 266*a* defines a first cross-sectional dimension, such as a first diameter $D_1$, perpendicular to the longitudinal direction 2. The pneumatic bolt 250 can define a second region 266*b* that defines a second cross-sectional dimension, such as a second diameter $D_2$, measured perpendicular to the longitudinal direction 2. The pneumatic bolt 250 can define an intermediate region 266*c*, between the first and second regions 266*a* and 266*b*. The intermediate region 266*c* has a third cross-sectional dimension, such as a third diameter $D_3$, measured perpendicular to the longitudinal direction 2. In the depicted example, the third diameter $D_3$ is less than the first and second diameters $D_1$, $D_2$, and the first and diameters $D_1$, $D_2$ are substantially equal. As such, the third region 266*c* can define a recess 270. However, it is contemplated that the first, second, and third diameters $D_1$, $D_2$, $D_3$ can be alternatively sized relative to each other desired. The recess 270 can extend from the first region 266*a* to the second region 266*b*, and thus the first and second regions 266*a*, 266*b* can be positioned on opposite sides of the recess 270.

The pneumatic bolt 250 can be configured to direct pressurized air from the channel 216 of the air manifold 202 to a respective dispensing module 75. To do this, the pneumatic bolt 250 can include at least one passage, such as a plurality of passages, extending therethrough. For example, the pneumatic bolt 250 can include a first air passage 286 that extends through body 254 at a location between the first and second regions 266*a* and 266*b*, such as through the intermediate region 266*c*. In one example, the first air passage 286 can extend into the recess 270 of the body 254. The first air passage 286 is configured to be in fluid communication with the channel 216 of the air manifold 202 when the pneumatic bolt 250 is received in a corresponding passage 220 of the air manifold 202. The first air passage 286 can extend from a first opening 286*a* defined at an outer surface of the body 254 to a second opening 286*b* defined at the outer surface, opposite the first opening 286*a*. The pneumatic bolt 250 can include a second air passage 290 that extends from the first air passage 286 to an outlet 290*a* defined by the second end 254*b*. As the second end 254*b* of the pneumatic bolt 250 can be releasably attached to a respective dispensing module 75, the outlet 290*a* allows the first and second air passages 286, 290 to be in fluid communication with the respective dispensing module 75.

In operation, the pneumatic bolt 250 can be inserted into a respective passage 220 of the air manifold 202 and engaged with one of the plurality of dispensing modules 75. When this occurs, the first air passage 286 can be in fluid communication with the channel 216 of the air manifold 202 such that pressurized air can be directed through the channel 216, into the first air passage 286, into the second air passage 290, and through the outlet 290*a* into the dispensing module 75. As a pneumatic bolt 250 is inserted into a passage 220, the first region 266*a* can be configured to engage the second seal 236 that is disposed in the passage 220, and the second region 266*b* can be configured to engage the first seal 232 that is disposed in the passage 220. This engagement between the pneumatic bolt 250 and the first and second seals 232, 236 prevents the pressurized air from leaking out of the air manifold assembly 200 as it flows from the air manifold 202, through the pneumatic bolt 250, and to the respective dispensing module 75. Further, the seal 282 of the pneumatic bolt 250 can engage the dispensing module 75 so as to further prevent pressurized air from leaking out from between the pneumatic bolt 250 and the respective dispensing module 75.

Figure 7:
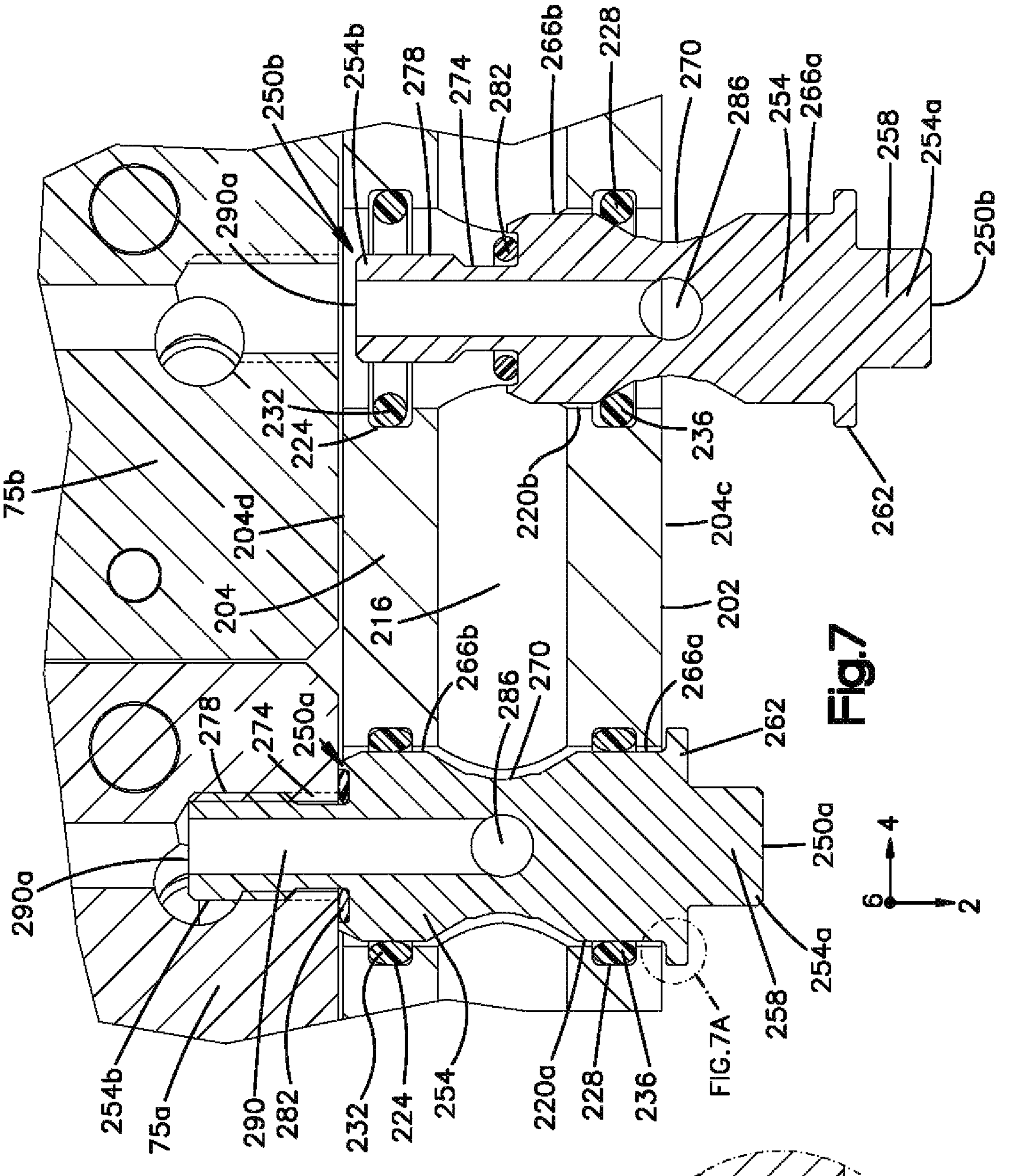
FIG. 7 illustrates a cross-sectional view of a portion of the air manifold assembly shown in FIG. 2, taken along line 7-7 shown in FIG. 2.
Figure 7A:
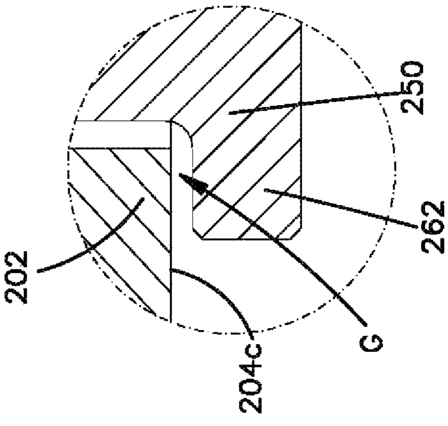
FIG. 7A illustrates an enlarged portion of the cross-sectional view of FIG. 7.

Referring now to FIG. 7A, when each pneumatic bolt 250 is fully inserted into one of the plurality of passages 220 such that the pneumatic bolt 250 engages the first and second seals 232, 236, the stop surface 262*a* can be spaced from the outer surface, such as front surface 204*c*, of the air manifold 202 such that a gap G is defined between the outer surface and the stop surface 262*a*. This gap G can allow the air manifold 202 to at least partially "float" on the pneumatic bolts 250, thus allowing for minor positional tolerances between the pneumatic bolts 250, the air manifold 202, and the dispensing modules 75. As such, the size of the gap G between each of the stop surfaces 262*a* of the pneumatic bolts 250 and the air manifold 202 can vary depending upon the particular dispensing modules 75 to which they are connected.

Once the pneumatic bolts 250 are attached to the plurality of dispensing modules 75 so as to attach the air manifold assembly 200 to the dispensing modules 75 and provide pressurized air to the dispensing modules 75, the applicator 10 can operate so as to dispense material. However, over time it can become necessary to remove one or more of the dispensing modules 75 for cleaning, or completely replace one or more of the dispensing modules 75. The air manifold assembly 200 described herein allows each of the plurality of dispensing modules 75 to be detached from the air manifold assembly 200 without detaching any of the other dispensing modules 75 from the air manifold assembly 200.

Referring to FIG. 7, the first pneumatic bolt 250*a* depicts the positioning of the pneumatic bolts 250 when engaged with one of the dispensing modules 75. When an operator wants to disengage one of the dispensing modules 75, the corresponding pneumatic bolt 250 is configured to be partially removed from the respective one of the plurality of passages 220 as depicted by second pneumatic bolt 250*b* in FIG. 7. To do this, the operator can use a tool to engage the engagement surface 258 and disengage the pneumatic bolt 250 from the dispensing module 75. In the partially removed position, the extension 274, and particularly the threading 278, can be completely disengaged from the dispensing module 75. Further, the second region 266*b* can be disposed within the respective one of the plurality of passages 220 between the first and second seals 232, 236. Additionally, the first region 266*a* can be disposed external to the air manifold 202. The partially removed position can be useful because in this position, the second seal 236 is configured to provide an interference that limits or prevents the pneumatic bolt 250 from falling out of the respective one of the plurality of passages 220. In particular, engagement between the second region 266*b* and the second seal 236 can prevent the pneumatic bolt 250 from falling out of the passage 220. When one of the pneumatic bolts 250 are in the partially removed position, the corresponding dispensing module 75 to which it was attached is configured to be detached from the manifold 50.

In addition to the partially removed position, each of the pneumatic bolts 250 can be detached from the dispensing modules 75 and fully removed from the passages 220 of the air manifold 202. This can be done by applying sufficient axial force along the longitudinal direction 2 after the extension 274 has been detached from the corresponding dispensing module 75. When this force is applied, the second region 266*b* can contact the second seal 236 with sufficient force to deform the second seal 236 outwards and allow the pneumatic bolt 250 to be removed from the respective passage 220. Like the partially removed position, one of the dispensing modules 75 is configured to be detached from the manifold 50 when a corresponding one of the plurality of pneumatic bolts 250 is fully removed from the respective one of the plurality of passages 220. After the dispensing module 75 has been detached from the manifold 50, the dispensing module 75 can be reattached to the manifold after maintenance has occurred. Alternatively, a new dispensing module 75 can be attached to the manifold 50 in its place.

Figure 8:
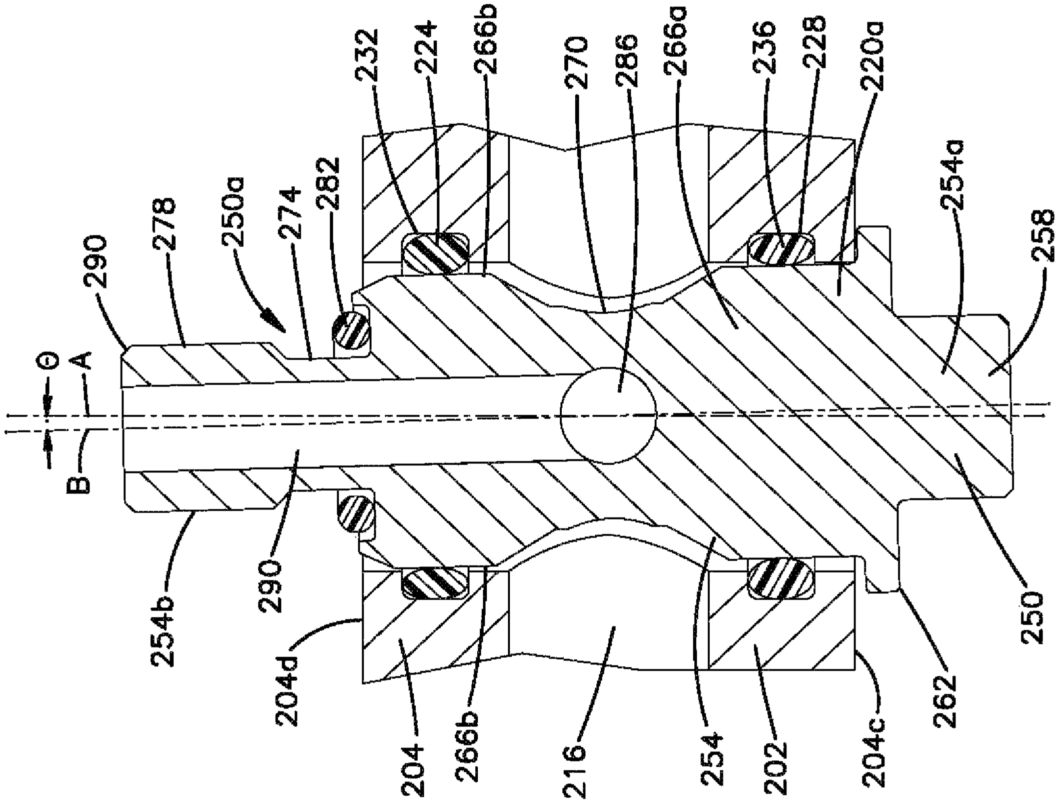
FIG. 8 illustrates a cross-sectional view of a portion of the air manifold assembly shown in FIG. 2, with a pneumatic bolt angularly offset with respect to the air manifold.

Referring to FIG. 8, the gap G defined between the stop surface 262*a* of the pneumatic bolt 250 and the air manifold 202, as well as the location of the first and second seals 232, 236 within the body 204 of the air manifold 202, provides flexibility when attaching the pneumatic bolt 250 to a dispensing module 75. In FIG. 7, the pneumatic bolts 250*a*, 250*b* are shown as received substantially coaxially within the passages 220, 220*b* of the air manifold 202. However, as shown in FIG. 8, each dispensing module 75 can be mounted to the body 54 of the manifold 50 at an angle. To accommodate this angular mounting, the gap G defined between the stop surface 262*a* of the pneumatic bolt 250 and the air manifold 202, as well as the location of the first and second seals 232, 236 within the body 204 of the air manifold 202, allows the pneumatic bolts 250 to be angularly offset with respect to the respective passage 220 within which they are received while still creating a fluid seal between the pneumatic bolt 250 and the first and second seals 232, 236. As shown in FIG. 8, the first passage 220*a* can extend along a first axis A, while the body 254 of the first pneumatic bolt 250*a* can be elongate along a second axis B. Though the first passage 220*a* and first pneumatic bolt 250*a* are specifically described, the description with respect to FIG. 8 can also apply to any of the plurality of passages 220*a*-220*j* and any of the plurality of pneumatic bolts 250*a*-250*j*. When inserted into the first passage 220*a*, the second axis B of the first pneumatic bolt 250*a* can be angularly offset from the first axis A of the first passage 220*a* by an angle Θ. The angle Θ can be any angle greater than or equal to 0 degrees. For example, the angle Θ can be between 0 degrees and 10 degrees, though other angles are contemplated. Additionally, though shown as being defined within a plane defined by the longitudinal and lateral directions 2, 4, the angle Θ can be defined in a plane defined by any combination of the longitudinal, lateral, and vertical directions 2, 4, 6. Further, any of the pneumatic bolts 250*a*-250*j* of a particular air manifold assembly 200 can be angularly offset with respect to the passages 220*a*-220*j* in which they are received to a different extent than any of other pneumatic bolts 250*a*-250*j*. This can depend upon how each individual dispensing module 75 to which the pneumatic bolts 250 are attached is secured to the manifold 50.

Figure 9:
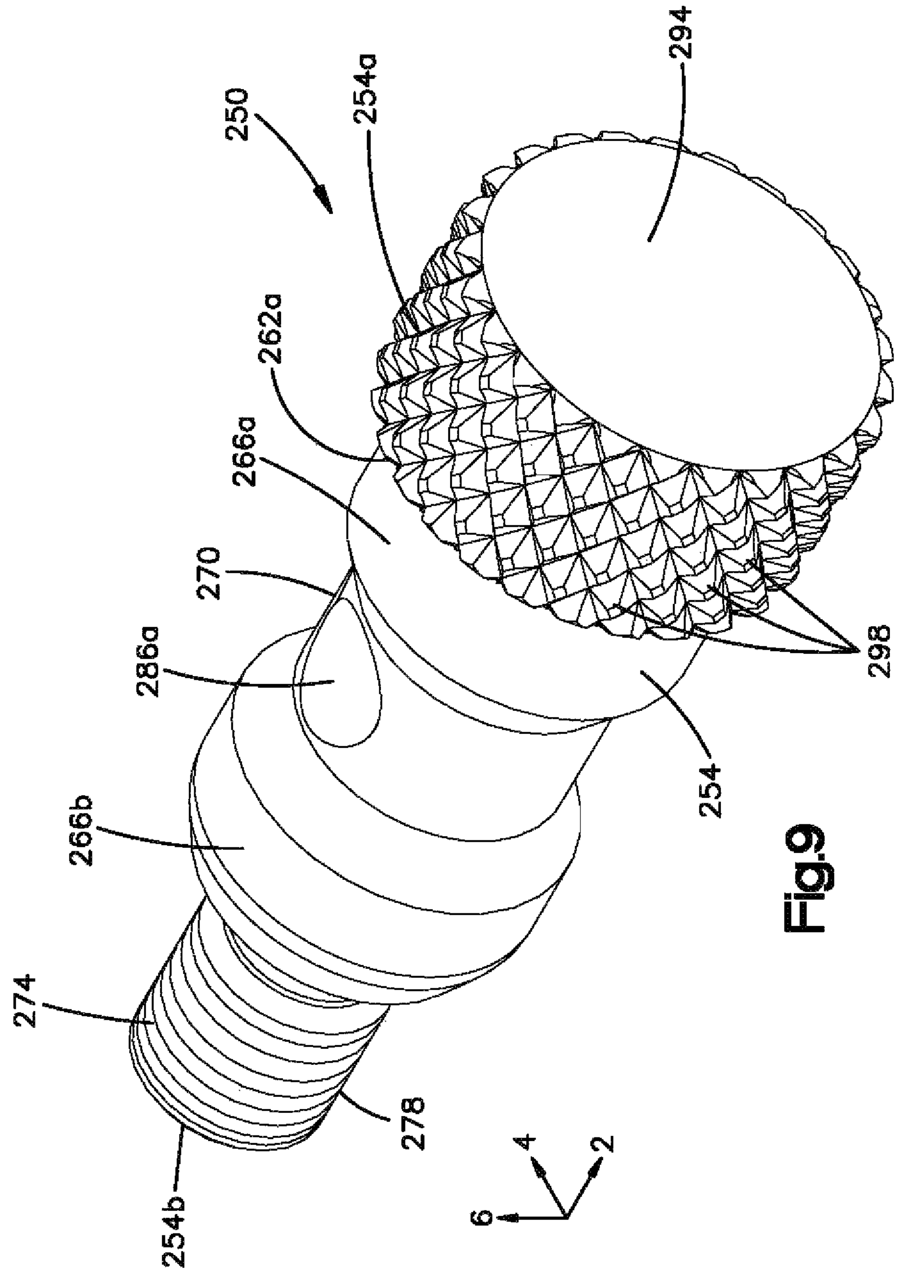
FIG. 9 illustrates a perspective view of a pneumatic bolt according to an alternative example of the present disclosure.

As stated above, it is contemplated that the pneumatic bolts 250 can each include an engagement surface 258 that allows the user to disengage the pneumatic bolts 250 from the plurality of dispensing modules 75 without the aid of any tool. Referring to FIG. 9, an alternative example of a pneumatic bolt 250' is shown, which is substantially similar to the pneumatic bolt 250 shown in FIGS. 5A-8. As such, similar features of the pneumatic bolt 250' are labeled as for the pneumatic bolt 250, and will not be described again here. In contrast to the pneumatic bolt 250, the pneumatic bolt 250' may be devoid of the flange 262. Instead, the first end 254*a* of the pneumatic bolt 250' can include a knob 294 that defines the stop surface 262*a* and the engagement surface 258. The knob 294 can be configured to be gripped by a hand to allow for manual detachment of the pneumatic bolt 250' from the dispensing module 75 to which it is attached. In operation, an operator of the applicator 10 can manually insert the pneumatic bolt 250' into a corresponding passage 220 of the manifold 202, and manually rotate the pneumatic bolt 250' so as to threadedly attach the pneumatic bolt 250' to a dispensing module 75. To detach the pneumatic bolt 250' from the dispensing module 75, the operator can likewise manually rotate the pneumatic bolt 250' until the pneumatic bolt 250' is no longer engaged with the dispensing module 75. Further, in operation the air manifold assembly 200 can include any combination of the pneumatic bolts 250, 250' as desired. In the depicted example, the knob 294 defines a plurality of ridges 298 configured to provide texture to the knob 294 so as to allow for easier manual gripping of the knob 294. However, it is contemplated that the knob 294 can be devoid of ridges 298, or can include ridges of different sizes and shapes, or can include other features that provide texture to the knob 294.

Figure 10:
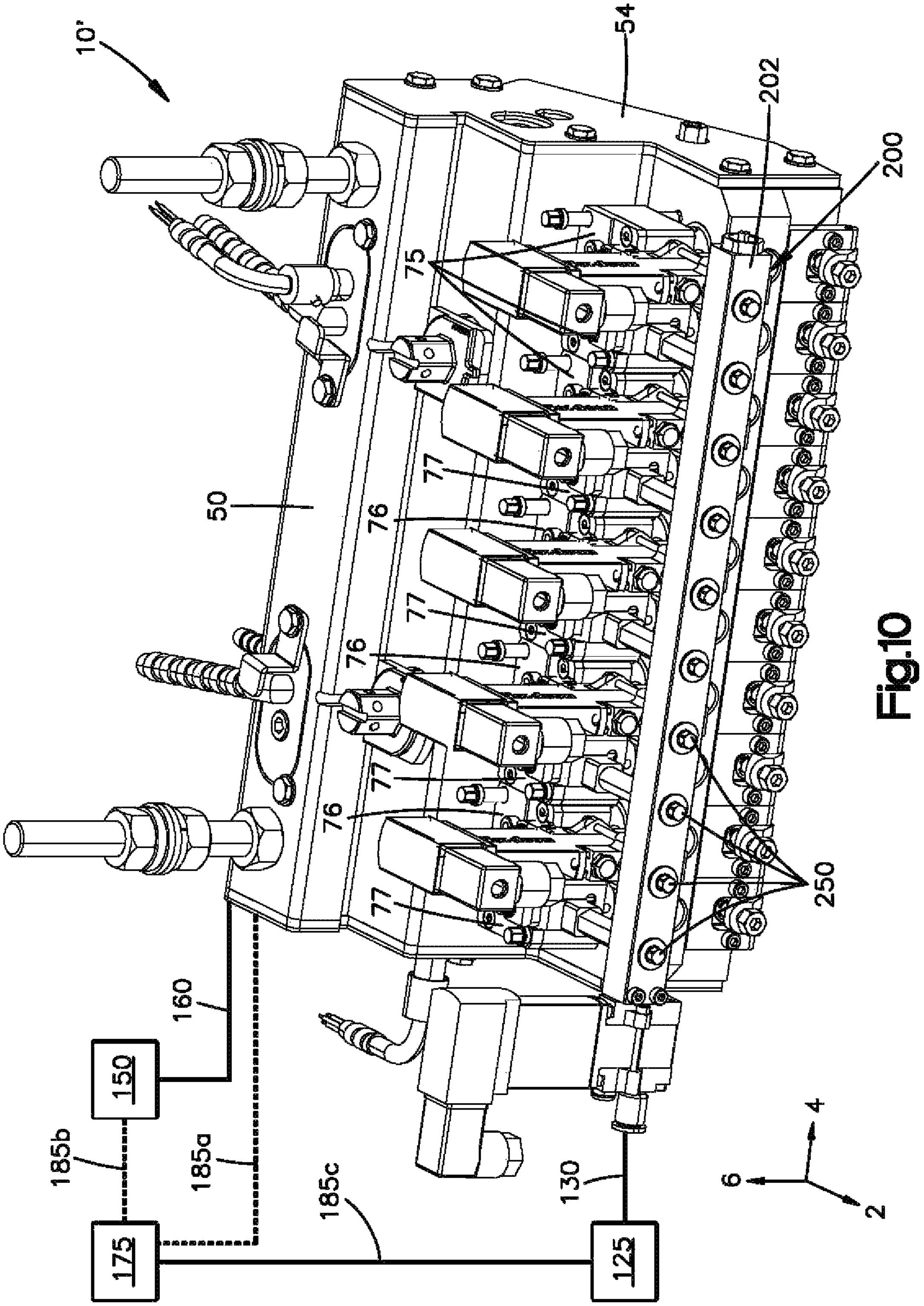
FIG. 10 illustrates a perspective view of an applicator according to another example of the present disclosure, with a material source, controller, and pressurized air source shown schematically.

Referring to FIG. 10, an alternative example of an applicator 10' will be described. The applicator 10' is substantially similar to the applicator 10 shown in FIG. 1, and as such similar features of the applicator 10' are labeled as they are for the applicator 10, and will not be described again here. Like the applicator 10, the applicator 10' can include a manifold 50 having a body 54, to which a plurality of dispensing modules 75 are configured to attach. However, the applicator 10' shown in FIG. 10 includes a plurality of intermittent dispensing modules 76 and a plurality of continuous dispensing modules 77 attached to the manifold 50. The continuous dispensing modules 77 can be configured to continuously dispense material when provided with the material, whereas the intermittent dispensing modules 76 can be configured to selectively dispense the material when provided with the material. Each of intermittent dispensing modules 76 can include a respective solenoid valve configured to control the selective material dispensing of that particular intermittent dispensing module 76. Further, in the place of the inlet adapter 240 of the applicator 10, the applicator 10' can include a solenoid valve 241 attached to the air manifold 202 at the first opening 208. The solenoid valve 241 can be configured to receive pressurized air through the conduit 130 from the pressurized air source 125 and selectively provide the pressurized air to the channel 216 of the air manifold 202 through the first opening 208. As such, the solenoid valve 241 can be configured to regulate the flow of pressurized air to each of the continuous dispensing modules 77 operably attached to the air manifold assembly 200. In conventional applicators that include both intermittent and continuous dispensing modules, a first air manifold is typically required for the continuous dispensing modules, and a second air manifold is typically required for the intermittent dispensing modules. The applicator 10', on the other hand, the continuous and intermittent dispensing modules are attached to the same air manifold. The use of the air manifold assembly 200 thus serves to significantly simplify the applicator 10' over conventional applicators that requires two separate air manifolds. It will be understood that, according to various examples, the applicator can have only continuous dispensing modules, only intermittent dispensing modules, or can have a combination of continuous and intermittent dispensing modules.

Although the air manifold assembly 200 of FIGS. 1 to 4 show an example in which the air inlet of the air manifold 202 is defined by an opening 208 at a first side surface 204*e* of the body 254, examples of the disclosure are not so limited. In some examples, the air inlet can be defined by an opening 210 that is between the first and second side surfaces 204*e* and 204*f* of the air manifold 202. For instance, the air inlet can be disposed within a central portion of the air manifold 202, and therefore can be referred to as a central opening 210. In some such examples, the opening 210 can be substantially midway between the first and second side surfaces 204*e* and 204*f*. In some such examples, the opening 210 can be disposed such that an equal number of passages 220 are disposed on opposed sides of the opening 210, where each passage 220 is configured to receive a corresponding one of the pneumatic bolts 250 and a corresponding one of the dispensing modules. Disposing the air inlet more centrally can reduce air flow variations across the air manifold to the various dispensing modules.

Turning to FIGS. 11 to 16, applicators 10'', 10''', and 10'''' are shown according to an alternative examples in which the air inlet of the air manifold 202', 202'' is disposed between the first and second side surfaces 204*e* and 204*f* of the air manifold 202', 202''. The applicators 10'', 10''', and 10'''' are substantially similar to the applicator 10 shown in FIG. 1, and the air manifold assemblies 200' and 200'' are substantially similar to the air manifold assembly 200 shown in FIG. 1. As such, similar features of the applicators 10'', 10''', 10'''' and air manifold assemblies 200' and 200'' are labeled as they are for the applicator 10 and air manifold assembly 200, and will not be described again here.

Figure 11:
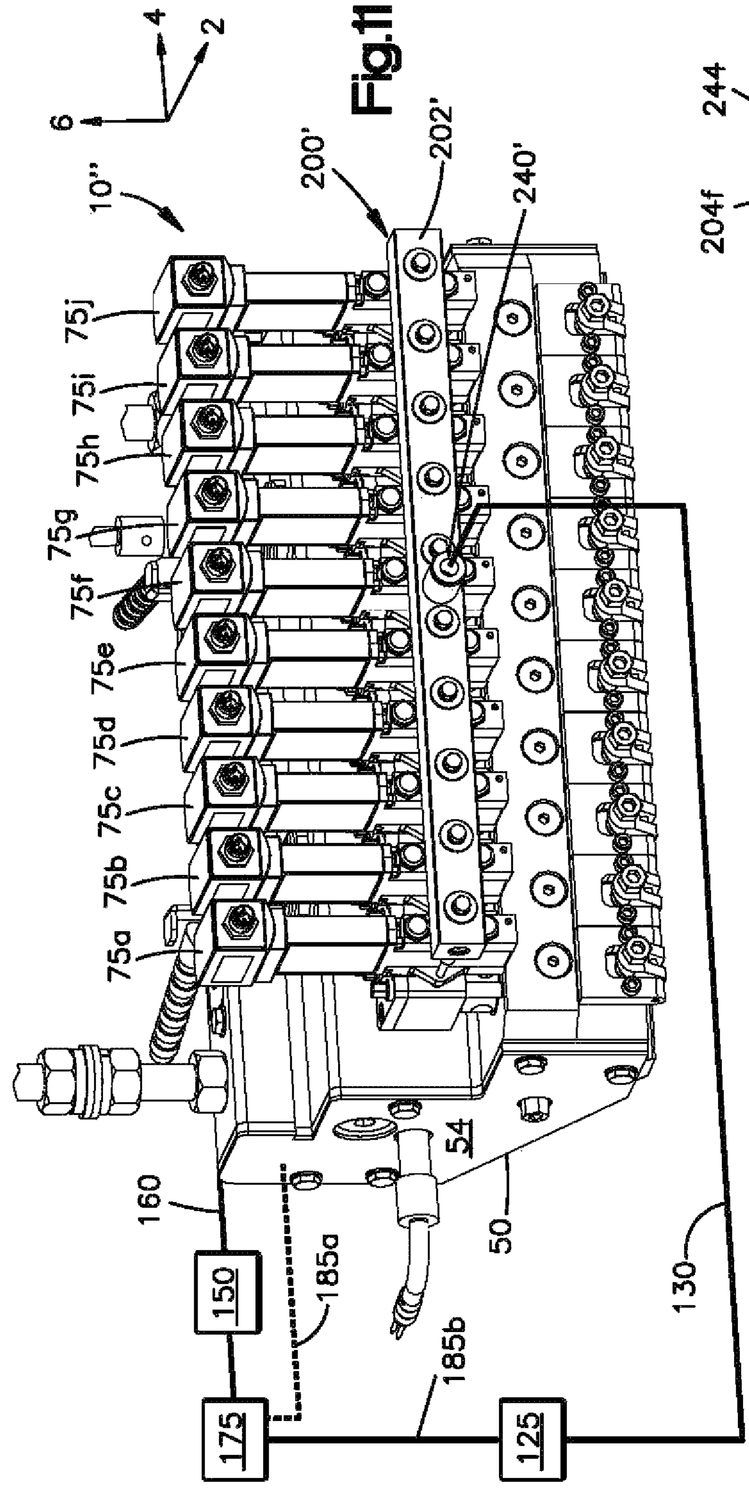
FIG. 11 illustrates a perspective view of an applicator according to yet another example of the present disclosure, with a material source, controller, and pressurized air source shown schematically.
Figure 12:
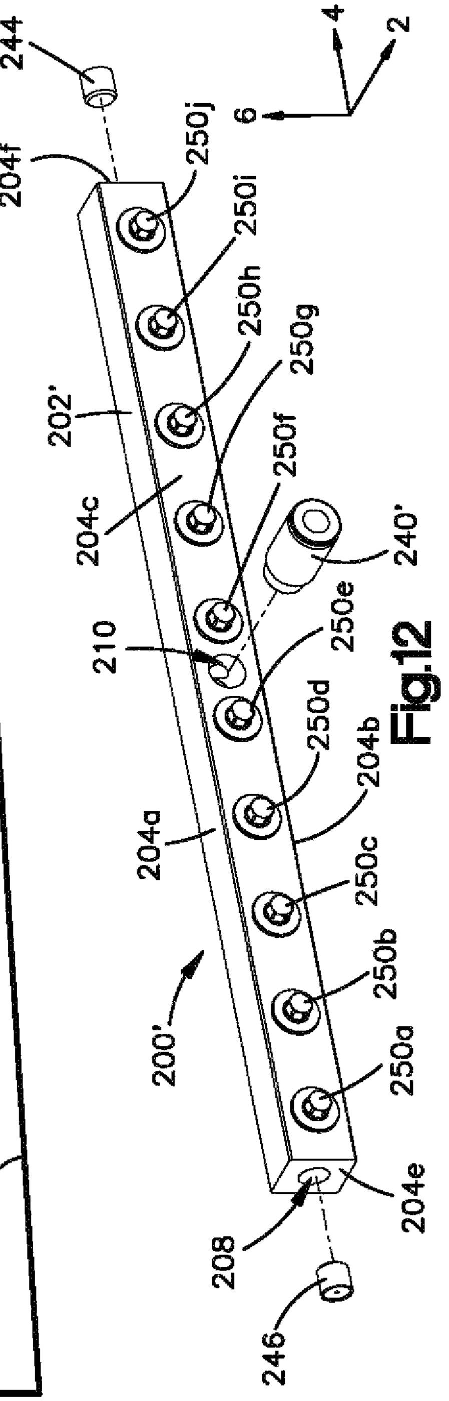
FIG. 12 illustrates a perspective exploded view of an air manifold assembly of the applicator shown in FIG. 11.
Figure 13:
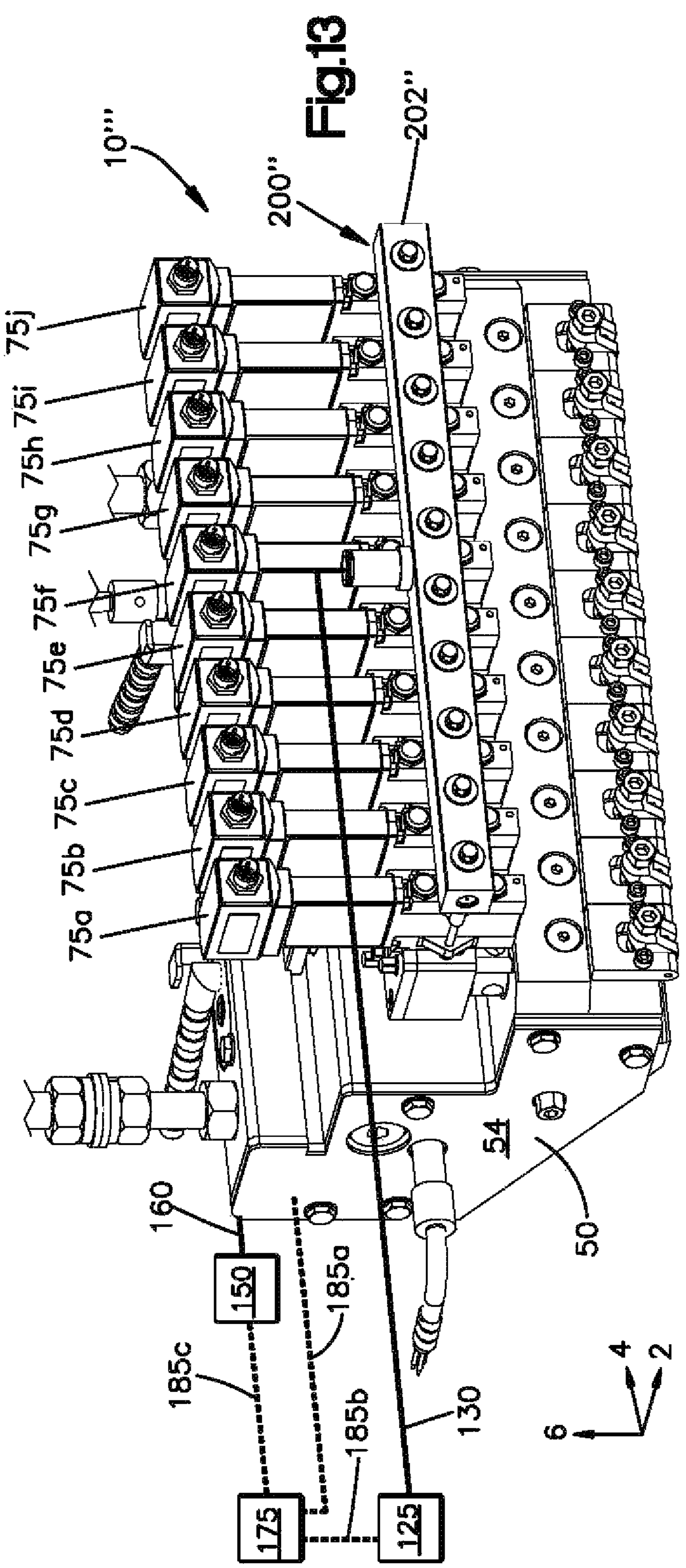
FIG. 13 illustrates a perspective view of an applicator according to yet still another example of the present disclosure, with a material source, controller, and pressurized air source shown schematically.
Figure 14:
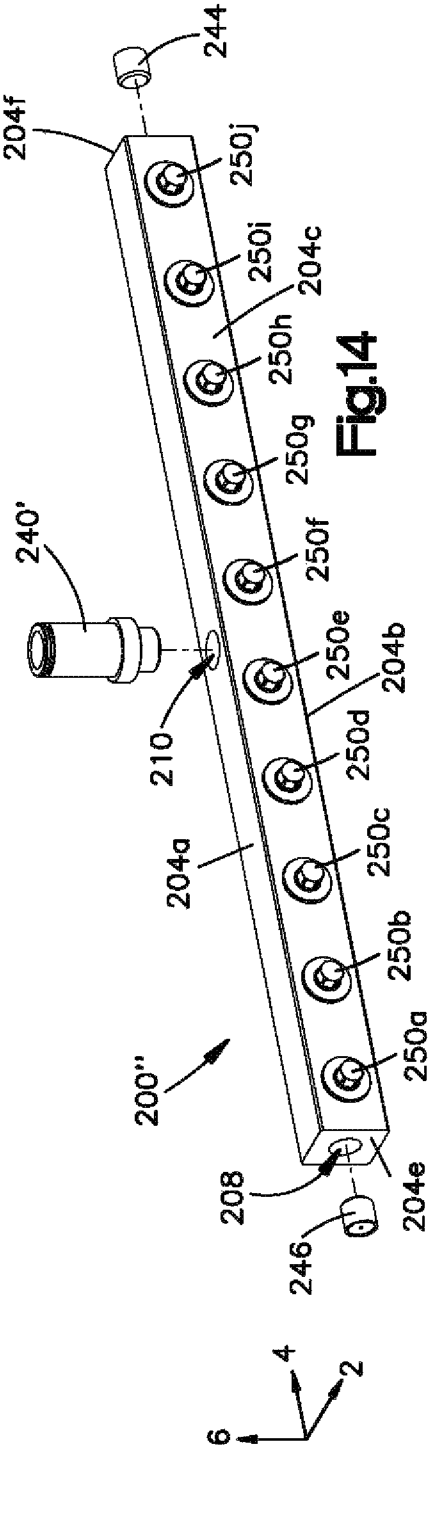
FIG. 14 illustrates a perspective exploded view of an air manifold assembly of the applicator shown in FIG. 13.

As shown in FIGS. 11 and 12, the air manifold 202' can define an opening 210 defines the air inlet and that extends into the front surface 204*c* of the manifold body 204. The opening 210 can be centrally located. For example, an equal number of passages 220 can be disposed on opposed sides of the opening 210, where each passage 220 is configured to receive a corresponding one of the pneumatic bolts 250. Alternatively, as shown in FIGS. 13 and 14, the opening 210 that defines the inlet can extend into the upper surface 204*a* as shown or into the lower surface 204*b* (not shown).

The applicator 10'' can include an inlet adapter 240' configured to be coupled to, such as at least partially received within, the opening 210. The inlet adapter 240' can be a conduit. For example, the inlet adapter 240' can comprise a pneumatic tube fitting, though other examples of the inlet adapter 240' are contemplated. The inlet adapter 240' can be configured to engage the conduit 130 at one end, so as to receive pressurized air from the pressurized air source 125. At the opposite end, the inlet adapter 240' can be configured to couple to, such as be at least partially received within, the opening 210 such that the opening 210 can receive the pressurized air from the pressurized air source 125. The inlet adapter 240' can engage the conduit 130 and/or the air manifold 202' through a threaded connection, clamping engagement, press-fit, snap-fit, etc., though other methods of engaging the inlet adapter 240' with the conduit 130 and the air manifold 202' are contemplated.

The applicator 10" can include a plug 246 configured to be coupled to, such as at least partially received within, the first opening 208. The applicator 10" can additionally, or alternatively, include a plug 244 configured to be coupled to, such as at least partially received within, the second opening 208. Each plug 244 and 246 can have a body sized and shaped to provide a fluid seal at a respective one of the first and second openings 208 and 212 such that pressurized air flowing within the body 204 of the air manifold 202 does not escape through the respective first and second openings 208 and 212. Each plug 244 and 246 can engage the body 204 through a threaded connection, clamping engagement, press-fit, snap-fit, etc., though other methods of engaging each plug 244 and 246 with the body 204 and are contemplated.

Figures 15, 16:
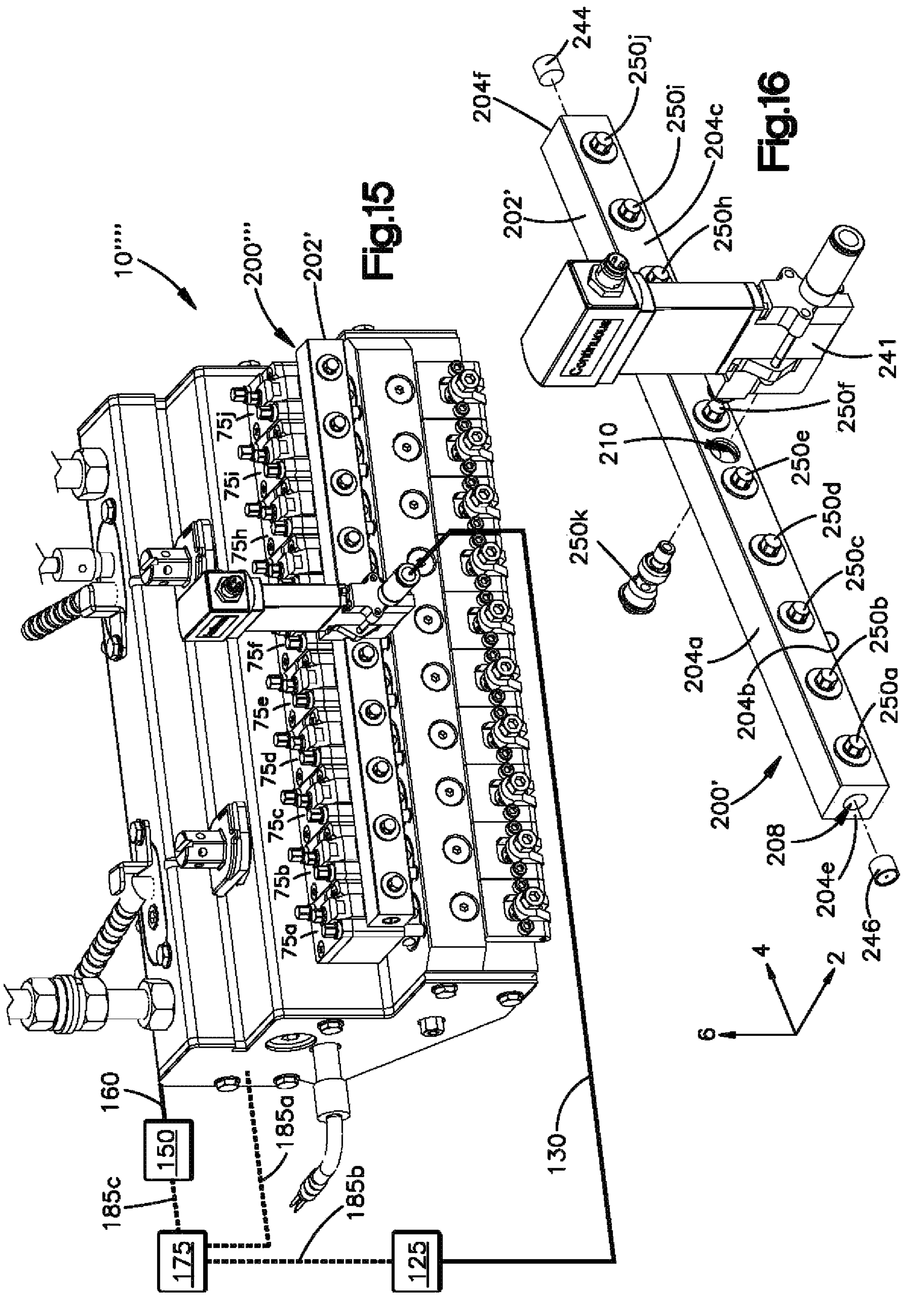
FIG. 15 illustrates a perspective view of an applicator according to even yet another example of the present disclosure, with a material source, controller, and pressurized air source shown schematically.
FIG. 16 illustrates a perspective exploded view of an air manifold assembly of the applicator shown in FIG. 15.

Turning briefly to FIGS. 15 and 16, the applicator 10'" can alternatively include a solenoid valve 241 in the place of the inlet adapter 240'. The solenoid valve 241 can be attached to the air manifold 202 at the opening 210. For example, the applicator 10"" can include a pneumatic bolt 250*k* that can be received at least partially through the opening 210 and can engage the solenoid valve 241. The pneumatic bolt 250*k* can include threading that is configured to threadingly engage the solenoid valve 241 or the pneumatic bolt 250*k* may include an alternative fastener for releasably attaching to the solenoid valve 241. For example, the pneumatic bolt 250 can be snap-fit or releasably attached through a variety of means to the solenoid valve 241.

The solenoid valve 241 can be configured to receive pressurized air through the conduit 130 from the pressurized air source 125 and selectively provide the pressurized air to the channel 216 of the air manifold 202 through the opening 210. As such, the solenoid valve 241 can be configured to regulate the flow of pressurized air to each of the dispensing modules 75 operably attached to the air manifold assembly 200'.

Figure 17:
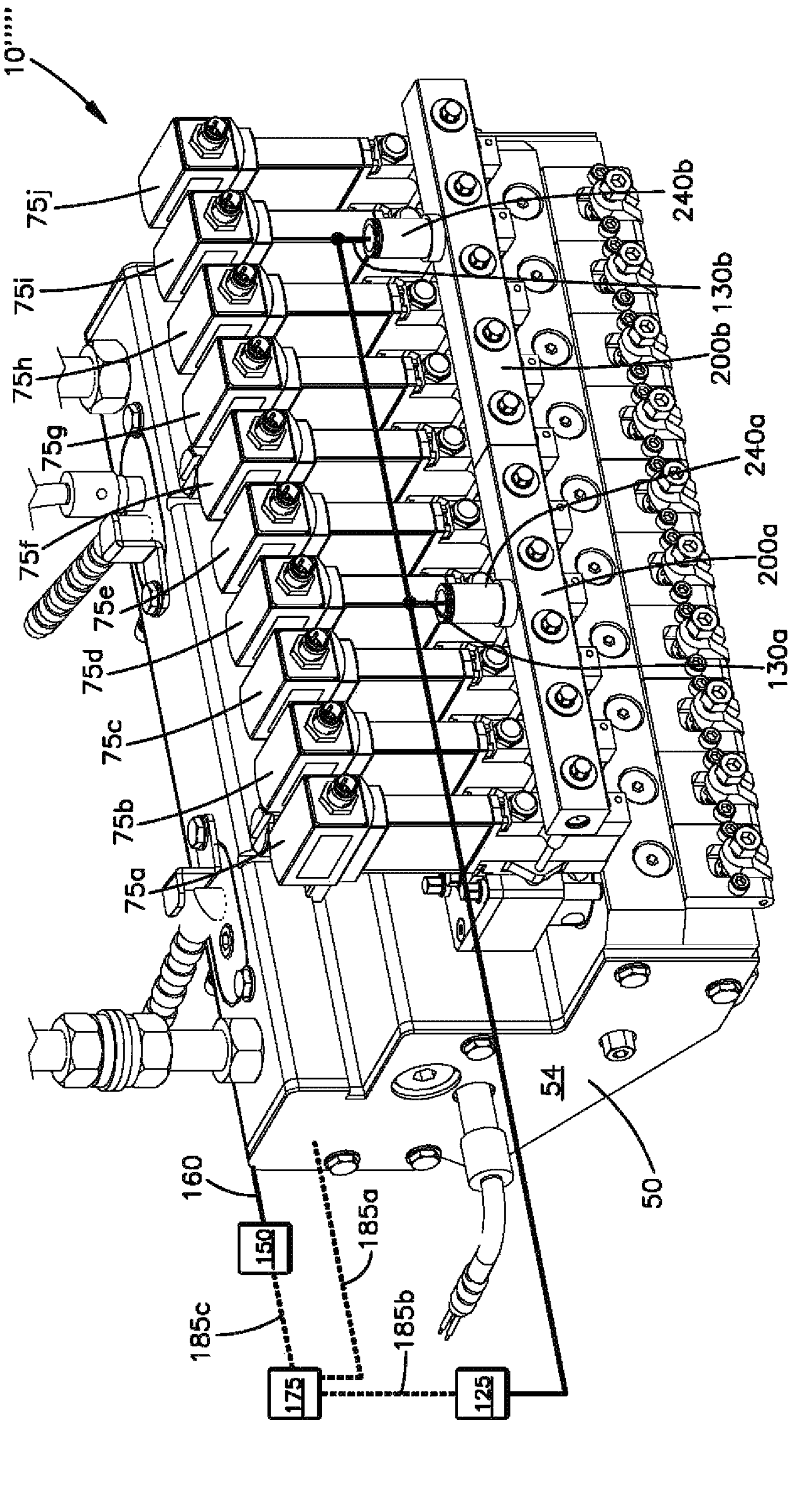
FIG. 17 illustrates a perspective view of an applicator according to even yet still another example of the present disclosure, with a material source, controller, and pressurized air source shown schematically.

Referring to FIG. 17, the applicator 10'"" can have a plurality of air manifolds assemblies 200, such as two air manifold assemblies 200*a*, 200*b*, or more than two air manifold assemblies. Each air manifold assembly 200*a*, 200*b* can be configured as described above in relation to any of air manifold assemblies 200, 200', 200", 200'". The applicator 10'"" can have a first conduit 130*a*, such as a hose or pipe, that is configured to provide air from the air source 125 to a first inlet adapter 240*a* or first solenoid (not shown) that provides the air to the first manifold assembly 200*a*. The applicator 10'"" can have a second conduit 130*b*, such as a hose or pipe, that is configured to provide air from the air source 125 to a second inlet adapter 240*b* or second solenoid (not shown) that provides the air to the second manifold assembly 200*b*.

In some instances, it may be desirable to operate an applicator with one or more of the dispensing modules 75, 76, 77 removed. For example, an operator may wish to vary the pattern of the material dispensed by the applicator and/or the width of the material dispensed by the applicator. In such instances, the operator can remove one or more of the dispensing modules from the air manifold and replace each of the one or more removed dispensing modules with a blank. For example, and with reference to FIGS. 18 and 18A, a blank 251 is shown according to one example. The blank 251 can have a first end 251*a* and second end 251*b* that are offset from one another. The blank 251 can define a recess 251*c* that extends into the first end 251*a* and terminates before the second end 251*b*. Thus, the recess 251*c* can be open at the first end 251*a* and closed at the second end 251*b*. In one example, the blank 251 can be implemented as a cap. The recess 251*c* can be configured to engage the extension 274 of the pneumatic bolt 250. In one example, the recess 251*c* can have internal threading that is configured to engage external threading of the extension 274. In other examples, the blank 251 can be configured to couple to the pneumatic bolt 250 using alternative fasteners. For example, the pneumatic bolt 250 can be snap-fit or releasably attached through a variety of means to the blank 251.

Figure 19:
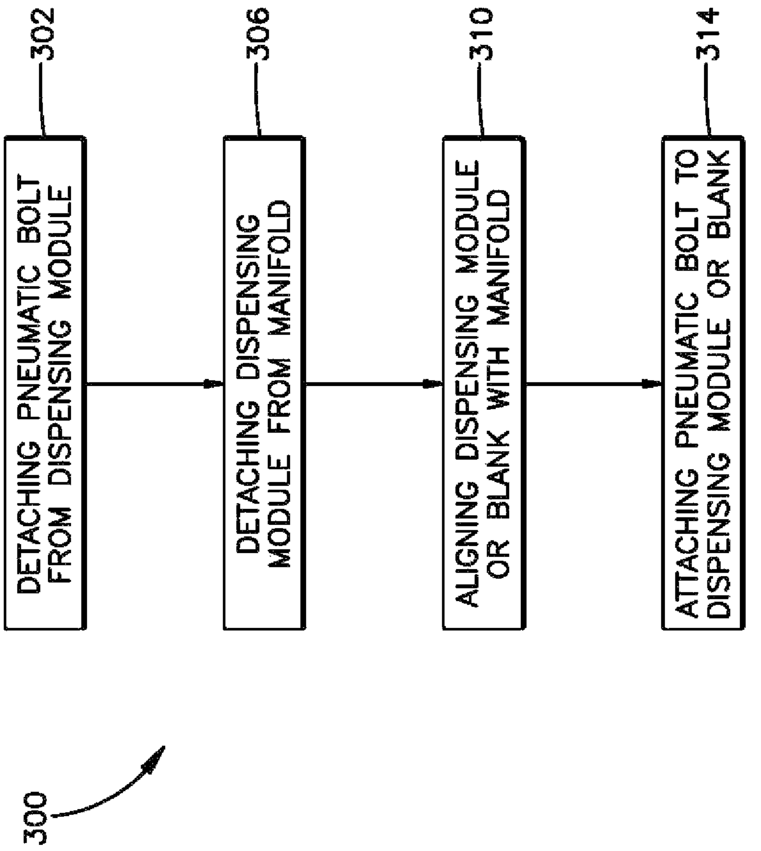
FIG. 19 illustrates a process flow diagram of a method of detaching a dispensing module of a plurality of dispensing modules from a manifold according to an example of the present disclosure.

Now referring to FIG. 19, a method 300 of servicing an applicator will be described. It will be understood that method 300 can be employed with any of the applicators described above. The method includes step 302, which comprises detaching a select pneumatic bolt 250 that extends through the air manifold 202 from a select dispensing module 75, where the air manifold 202 is attached to the plurality of dispensing modules 75 and is configured to provide pressurized air to the plurality of dispensing modules 75 through a plurality of pneumatic bolts 250. Detaching the select pneumatic bolt 250 can include partially removing the select pneumatic bolt 250 from the passage 220 that extends through the air manifold 202, as described above. Detaching the select pneumatic bolt 250 can additionally, or alternatively, include fully removing the select pneumatic bolt 250 from the passage 220 that extends through the air manifold 202, as described above. In some examples, detaching the select pneumatic bolt 250 can include threadedly disengaging the select pneumatic bolt 250 from the dispensing module 75. In some examples, detaching the select pneumatic bolt 250 can include engaging an engagement surface 258 of the select pneumatic bolt 250 defined by the first end 254*a* of the select pneumatic bolt 250 with a tool or hand.

After step 302 is performed, step 306 can include detaching the select dispensing module 75 from the manifold 50 while one or more other dispensing modules 75 remain attached to the manifold 50 and the air manifold. In some examples, the select dispensing module 75 is detached while at least one other of the dispensing modules remains attached to both the manifold 50 and air manifold 202. In some such examples, the select dispensing module 75 is detached without detaching any other of the plurality of dispensing modules 75 from the manifold 50 and air manifold 202. This allows the detached dispensing module 75 to be removed, serviced, or replaced without affecting operation of other ones of the dispensing modules 75. Then, in step 310, the same dispensing module 75 (e.g., after maintenance) or a replacement dispensing module 75 can be attached to the manifold 50. In step 314, a pneumatic bolt 250 (either the one that was previously detached from the dispensing module 75 or another pneumatic bolt) can be attached to the dispensing module 75, and pressurized air can be directed through the air manifold 202, through the pneumatic bolt 250, and to the dispensing module 75. Alternatively, in step 310, a blank 251 can be aligned with the air manifold in place of the dispensing module 75 that was removed. Then, in step 314, the pneumatic bolt 250 can be attached to the blank 251 in a manner similar to the manner in which the pneumatic bolt 250 is attached to the dispensing module 75 (e.g., by threadedly or otherwise connecting the pneumatic bolt 250 to the blank). Steps 302 to 314 can be repeated for each of one or more other dispensing modules 75 throughout the working life of the applicator 10 as desired.

Utilizing applicators 10, 10', 10", 10'", 10"", 10'"" that include the air manifold assembly 200, 200', 200", 200'", **200*a*, 200*b* as described above has several advantages. When maintenance or replacement is desired for one of the dispensing modules 75, 76, 77, the particular dispensing module 75, 76, 77 at issue can be removed by an operator of the applicator without completely detaching the air manifold assembly from the remaining dispensing modules 75, 76, 77 or by detaching any of the other dispensing modules 75, 76, 77 from the manifold 50. Additionally, the pneumatic bolts 250, 250' allow for the dispensing modules 75, 76, 77 to be easily detached from the air manifold assembly 200** without requiring undue force or effort, and as such the risk of damaging delicate components of the applicator is decreased, as is risk of injury to the operator of the applicator.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. An applicator for dispensing a material, the applicator comprising:

a manifold;

a plurality of dispensing modules releasably attached to the manifold, wherein each of the plurality of dispensing modules is configured to selectively dispense the material;

an air manifold removably connected to each of the plurality of dispensing modules such that at least one of the dispensing modules can be removed from the applicator while at least one other of the dispensing modules remains attached to both the manifold and the air manifold, the air manifold defining an inlet configured to receive pressurized air from a pressurized air source, a plurality of passages that extend through the air manifold, and a channel extending from an input to the plurality of passages such that the plurality of passages are in fluid communication with the channel, each of the plurality of passages being in fluid communication with a respective one of the plurality of dispensing modules to direct the pressurized air from the channel to the respective one of the plurality of dispensing modules; and a plurality of pneumatic bolts, wherein each of the plurality of pneumatic bolts is configured to:

(a) be disposed in a respective one of the plurality of passages;

(b) attach to a respective one of the plurality of dispensing modules; and (c) direct the pressurized air from the channel of the air manifold to the respective one of the plurality of dispensing modules.

2. The applicator of claim 1, wherein each of the plurality of dispensing modules is configured to be removed from the applicator while one or more other of the plurality of dispensing modules are attached to both the manifold and the air manifold.

3. The applicator of claim 1, wherein each of the plurality of dispensing modules is configured to be removed from the applicator without detaching any other of the plurality of dispensing modules from the air manifold.

4. The applicator of claim 1, wherein each of the plurality of pneumatic bolts has a body that is elongate along a first axis and each of the plurality of passages extends along a second axis, wherein each of the pneumatic bolts is configured to form a fluid tight seal with a corresponding one of the passages in which the at least one of the plurality of pneumatic bolts is disposed when the first axis of the at least one of the plurality of pneumatic bolts is angularly offset from the second axis of the corresponding one of the plurality of passages.

5. The applicator of claim 1, wherein each of the plurality of pneumatic bolts has a body defining a first region, a second region, and an intermediate region between the first and second regions.

6. The applicator of claim 5, the intermediate region has a cross-sectional dimension that is less than that of each of the first and second regions.

7. The applicator of claim 5, wherein each of the plurality of passages is configured to receive a first seal and a second seal, wherein the channel is positioned between the first and second seals.

8. The applicator of claim 7, wherein the first region of each of the plurality of pneumatic bolts is configured to engage the second seal disposed in the respective one of the plurality of passages, and the second region of each of the plurality of pneumatic bolts is configured to engage the first seal disposed in the respective one of the plurality of passages.

9. The applicator of claim 8, wherein each of the plurality of pneumatic bolts is configured to be partially removed from the respective one of the plurality of passages, such that the second region is disposed within the respective one of the plurality of passages between the first and second seals and the first region is disposed outside the air manifold.

10. The applicator of claim 9, wherein when each of the plurality of pneumatic bolts is partially removed from the respective one of the plurality of passages, the second seal is configured to provide an interference that restricts a respective pneumatic bolt from falling out of the respective one of the plurality of passages.

11. The applicator of claim 8, wherein each of the plurality of pneumatic bolts is configured to be fully removed from the respective one of the plurality of passages.

12. The applicator of claim 5, wherein each of the plurality of pneumatic bolts defines a first end, a second end opposite the first end that is configured to be releasably attached to the respective one of the plurality of dispensing modules, a first air passage that extends through the intermediate region and is in fluid communication with the channel of the air manifold, and a second air passage that extends through the body of the at least one of the plurality of pneumatic bolts from the first air passage to an outlet defined by the second end.

13. The applicator of claim 12, wherein the second end of each of the plurality of pneumatic bolts is configured to threadedly engage the respective one of the plurality of dispensing modules.

14. The applicator of claim 12, wherein the first end of each of the plurality of pneumatic bolts defines an engagement feature that is configured to interface with a tool that is configured to detach the plurality of pneumatic bolts from the dispensing modules.

15. The applicator of claim 12, wherein the first end of each of the plurality of pneumatic bolts defines a knob configured to allow for manual detachment of the plurality of pneumatic bolts from the dispensing modules.

16. The applicator of claim 1, wherein one of the plurality of dispensing modules is configured to be detached from the manifold when a corresponding one of the plurality of pneumatic bolts is partially or fully removed from the respective one of the plurality of passages.

17. The applicator of claim 1, wherein the air manifold comprises an inlet adapter configured to couple to the inlet and receive the pressurized air from the pressurized air source.

18. The applicator of claim 1, wherein the air manifold comprises a solenoid valve attached to the air manifold at the inlet, wherein the solenoid valve is configured to receive the pressurized air from the pressurized air source and selectively provide the pressurized air to the channel of the air manifold through the inlet.

19. A method of servicing a fluid material applicator that comprises a manifold, a plurality of dispensing modules attached to the manifold, and an air manifold that is attached to the plurality of dispensing modules, the method comprising:

detaching a select dispensing module of the plurality of dispensing modules from the air manifold by detaching a select pneumatic bolt that extends through the air manifold to the select dispensing module, wherein the select pneumatic bolt is configured to provide pressurized air from the air manifold to the select dispensing module through when the select pneumatic bolt attaches the select dispensing module to the air manifold; and detaching the select dispensing module from the manifold while at least one other of the plurality of dispensing modules remains attached to both the manifold and the air manifold.

20. The method of claim 19, wherein detaching the select pneumatic bolt includes partially removing the select pneumatic bolt from a passage that extends through the air manifold.

21. The method of claim 19, wherein detaching the pneumatic bolt includes threadedly disengaging the pneumatic bolt from the dispensing module.

* * * * *